US006556937B1

(12) United States Patent
Byers

(10) Patent No.: US 6,556,937 B1
(45) Date of Patent: Apr. 29, 2003

(54) SYNCHRO/RESOLVER BRIDGE AND AUTOMATIC TEST SYSTEM

(76) Inventor: Darren D. Byers, 205 Butchcash Rd., Hazel Green, AL (US) 35750

( * ) Notice: Subject to any disclaimer, the term of this patent is extended or adjusted under 35 U.S.C. 154(b) by 0 days.

(21) Appl. No.: 09/914,821

(22) PCT Filed: Mar. 2, 2000

(86) PCT No.: PCT/US00/05762
§ 371 (c)(1),
(2), (4) Date: Aug. 31, 2001

(87) PCT Pub. No.: WO00/52486
PCT Pub. Date: Sep. 8, 2000

Related U.S. Application Data

(60) Provisional application No. 60/122,637, filed on Mar. 3, 1999.

(51) Int. Cl.[7] .................................................. G01C 25/00
(52) U.S. Cl. ......................... 702/116; 323/365; 324/648
(58) Field of Search ........................... 702/116; 323/365; 324/648

(56) References Cited

U.S. PATENT DOCUMENTS 4,821,217 A * 4/1989 Jackson et al. ................ 701/3

* cited by examiner

Primary Examiner—John Barlow
Assistant Examiner—Meagan Walling
(74) Attorney, Agent, or Firm—Kris T. Fredrick

(57) ABSTRACT

A digital synchro/resolver bridge is provided, which may be operated individually, or optionally, may be interfaced with a computer for inclusion in an automated test system. The digital bridge includes a plurality of relay modules operated by an embedded processor to digitally set taps for a plurality of integral transformer windings. The bridge provides feedback to the computer in the form of status messages and also to the front panel thereof, for local mode (i.e., stand along) use. The resolver bridge utilizes a standard communication interface, such as a conventional RS232 interface. The resolver bridge performs a power-on self-test to insure accurate calibration prior to testing of individual resolvers.

32 Claims, 37 Drawing Sheets

Microfiche Appendix Included
(2 Microfiche, 102 Pages)

SCHEMATIC, RSVR/SYN BRIDGE- MOD. 540

SYNCRO/ RESOLVER CONTROLLER MAIN PROGRAM FLOW DIAGRAM

INTERRUPT SERVICE ROUTINES:
A. INTR ON RCVD CHARACTER
B. INT ON KEYPRESS

MAJOR SUBROUTINES:
A. GRAPHICS - LCD MODULE CONTROL
B. RELAY SWITCH SETTING - DPI SERIAL
C. RECEIVE DATA - RX ⎫ SCI
D. SEND DATA    - TX ⎭
E. READ KEYBOARD KEYPRESS
F. RECOGNIZE COMMANDS & DATA

COMMAND SET:
A. SET - SET BRIDGE SWITCHES
B. SET? - RETURN CURRENT SETTING
C. INC - INCREMENT SWITCH SETTING
D. DEC - DECREMENT SWITCH SETTING
E. LLO - LOCAL PANEL LOCKOUT
F. GO TO LOCAL MODE
G. RMT - GO TO REMOTE MODE
H. TEST - RUN SELF TEST
I. TEST? - RETURN RESULTS OF LAST TEST
J. RST - RESET CONTROLLER
K. TEXT - DISPLAY TEXT

FIG. 14c

| ANGLE | PASS/FAIL | ERROR |
|---|---|---|
| 1 | PASS | 0.758 |
| 2 | PASS | 1.596 |
| 3 | PASS | 3.324 |
| 4 | PASS | -1.739 |
| 5 | PASS | -2.256 |
| 6 | PASS | 0.411 |
| 7 | PASS | -2.605 |
| 8 | PASS | -2.334 |
| 9 | PASS | -2.623 |
| 10 | PASS | -5.558 |
| 354 | PASS | -2.757 |
| 355 | PASS | -2.419 |
| 356 | FAIL | -7.414 |
| 357 | PASS | -5.571 |
| 358 | PASS | -6.315 |
| 359 | PASS | -6.189 |
| 360 | PASS | 0.103 |

*154*

EXCITATION VOLTAGE   26 VAC   } INPUT

EXCITATION FREQUENCY   400 HERTZ }

PRIMARY CURRENT   0.063 ma PASS

PRIMARY POWER   1.065 Watts PASS

D.C. RESISTANCE-ROTOR   998 "OHM" PASS

D.C. RESISTANCE-STATOR   267 "OHM" PASS

IMPEDANCE -ZPO-   272 -314 PASS

IMPEDANCE -ZSO-   986 -529 PASS

IMPEDANCE -ZSS-   1036 -468 PASS

TRANSFORMATION RATIO   0.4391 PASS

PHASE SHIFT   39.57 PASS

SYNCHRO/RESOLVER BRIDGE AND AUTOMATIC TEST SYSTEM

This application claims the benefit of provisional application No. 60/122,639, filed Mar. 3, 1999.

APPENDICES

Two Appendices (Appendix A and Appendix B) are filed with this application. Appendix A is a Microfiche Appendix comprising a 101 page software code listing, and contains two (2) slides and 102 frames Appendix B is a 2 page listing of mathematical equations referenced in this application.

BACKGROUND OF THE INVENTION

1. Field of the Invention

This invention relates to test equipment, and more particularly to resolver bridges for testing high accuracy angular position sensors.

2. Background Information

Resolvers and synchros are commonly utilized to detect the angular position of members relative to one another in applications requiring a relatively high degree of precision and accuracy. Examples of such applications include military applications such as the turrets of battlefield tanks, and various military and commercial satellite applications where components must be oriented directionally with a large degree of precision.

Such synchros and resolvers must therefore be accurately calibrated and tested to insure that they perform to a known degree of accuracy. Accordingly, synchros and resolvers are typically tested utilizing an analog synchro/resolver bridge such as the model 540 synchro/resolver bridge sold by North Atlantic Industries, Inc. of Hauppauge, N.Y., U.S.A.

Briefly described, conventional synchros or resolvers such as the model number Z2450 sold by Siebe Position and Temperature Sensors of Woonsocket, R.I., include transformer assemblies with windings disposed on first and second members adapted for rotational movement relative to one another Such movement may generate a change in voltage, current, impedance, or phase in electrical signals propagating through the windings which change corresponds to the angular position of the first member relative to the second member. The conventional analog synchro/resolver bridge includes similar transformer assemblies, which are adapted to generate electrical signals of varying voltage, current, impedance, or phase to simulate the output of the synchro or resolver at predetermined rotational positions of the first member relative to the second member. The electrical signals generated by the bridge are varied by manually setting a plurality of taps on the transformer windings at positions, which correspond to the predetermined rotational positions. Typically, test procedures require an operator to set the synchro/resolver to a first angle, then set the taps of the bridge to the corresponding angle, and then record the difference or phase shift between the signals generated by the synchro/resolver and the bridge. This sequence must then be repeated for a series of angles for each synchro/resolver.

While this conventional test procedure using the analog bridge has resulted in accurate quality testing and calibration, it is relatively labor intensive and time consuming. Thus, a need exists for a digital synchro/resolver bridge, which may be easily interfaced with a computer for either stand alone operation or automated computer control.

BRIEF DESCRIPTION OF THE DRAWINGS

FIGS. 14a–14c are flow diagrams of the software program incorporated into the digital synchro/resolver bridge of the present invention;

FIG. 18 is a listing of test parameters and test results for a representitive test sequence generated by the automatic resolver test station of the present invention;

DETAILED DESCRIPTION OF THE PREFERRED EMBODIMENTS

Figure 1A:
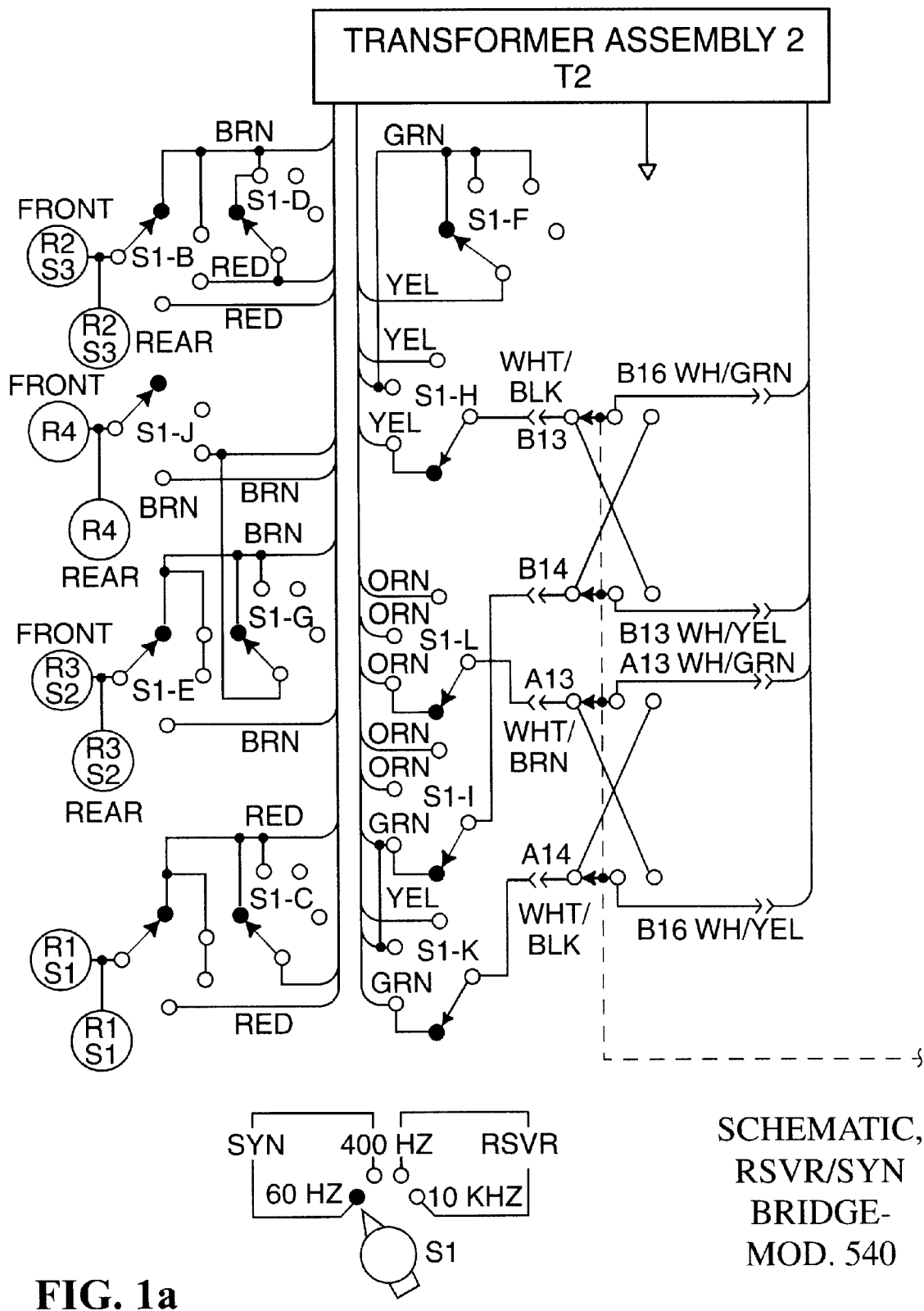
FIGS. 1a–1c are schematics of an analog synchro/resolver bridge of the prior art.

Referring to the figures set forth in the accompanying Drawings, the illustrative embodiments of the present invention will be described in detail hereinbelow. For clarity of exposition, like features shown in the accompanying Drawings shall be indicated with like reference numerals and similar features as shown in alternate embodiments in the Drawings shall be indicated with similar reference numerals.

Figure 16:
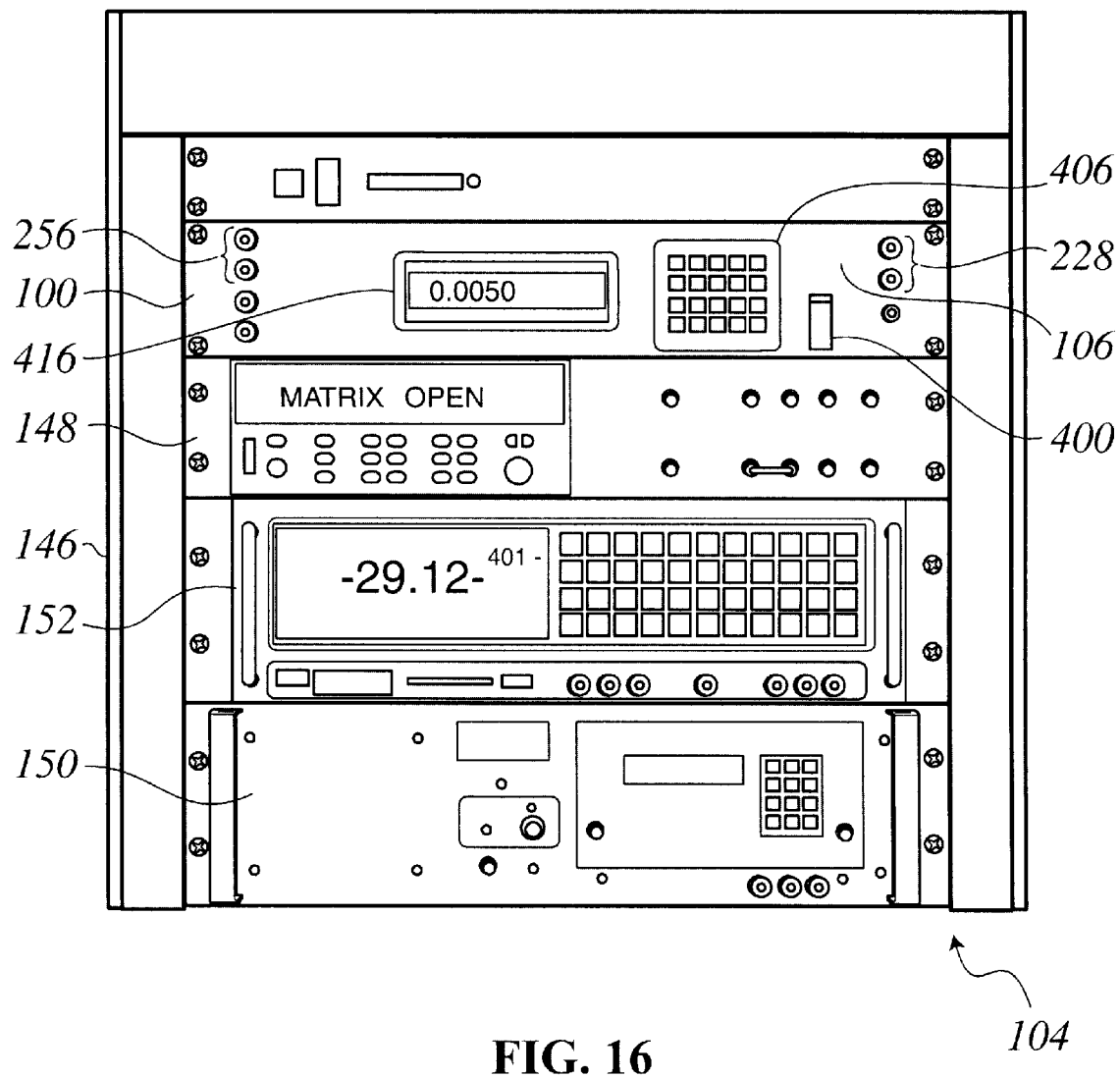
FIG. 16 is an enlarged view of portions of the resolver test station of FIG. 15.
Figure 17:
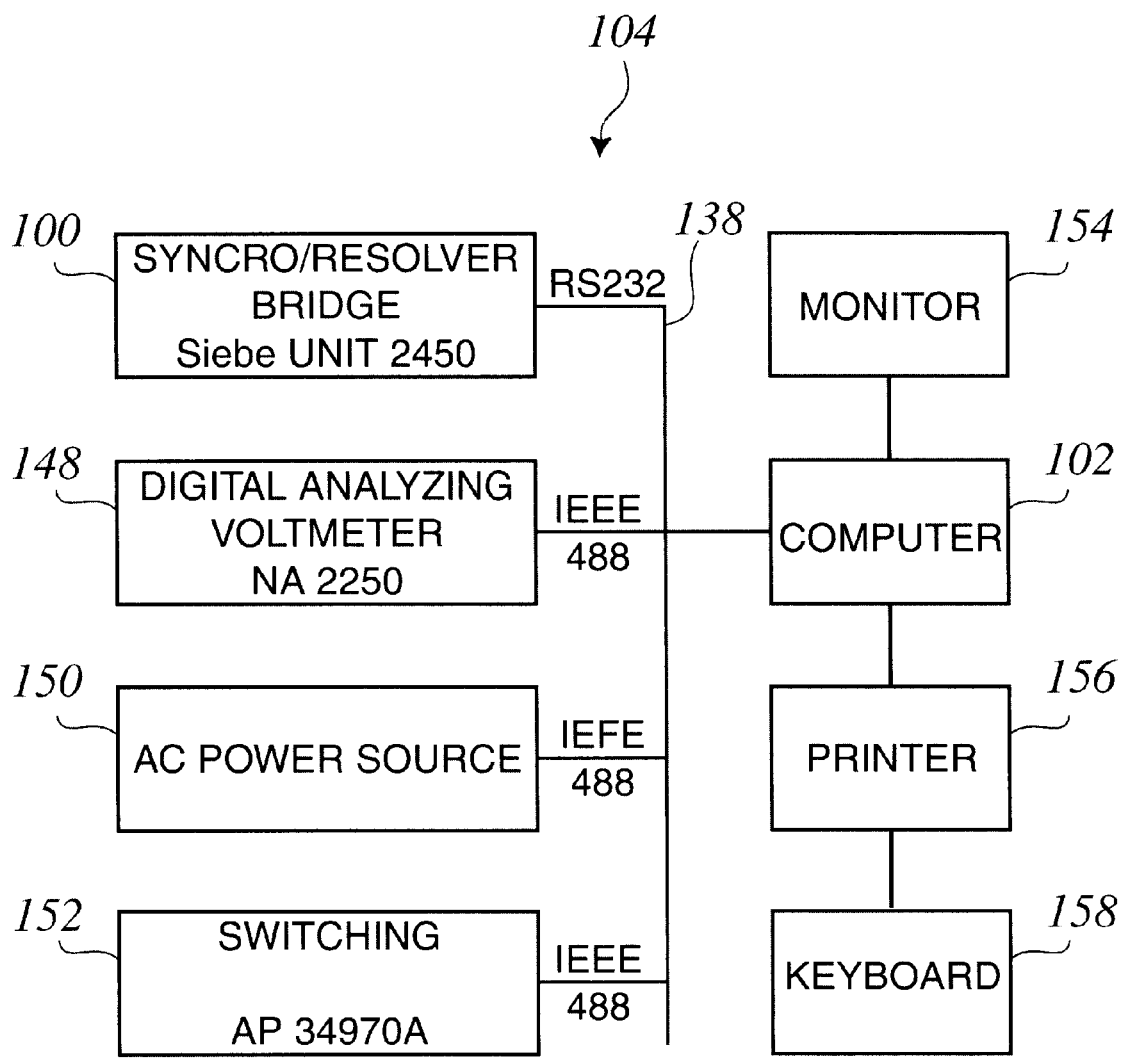
FIG. 17 is a block diagram of the automatic resolver test station of the present invention.

As best shown in FIG. 17, the present invention includes a digital synchro/resolver bridge 100 which may be interfaced with a computer 102 for inclusion in an automated test system 104. The bridge 100 provides feedback to the computer 102 in the form of status messages and also to the front panel 106 (FIG. 16) thereof, for local mode (i.e., stand alone) use. The bridge 100 utilizes a standard communication interface, such as, for example, a conventional RS232 interface. For reliability, the bridge 100 performs a power-on self-test.

Figure 1B:
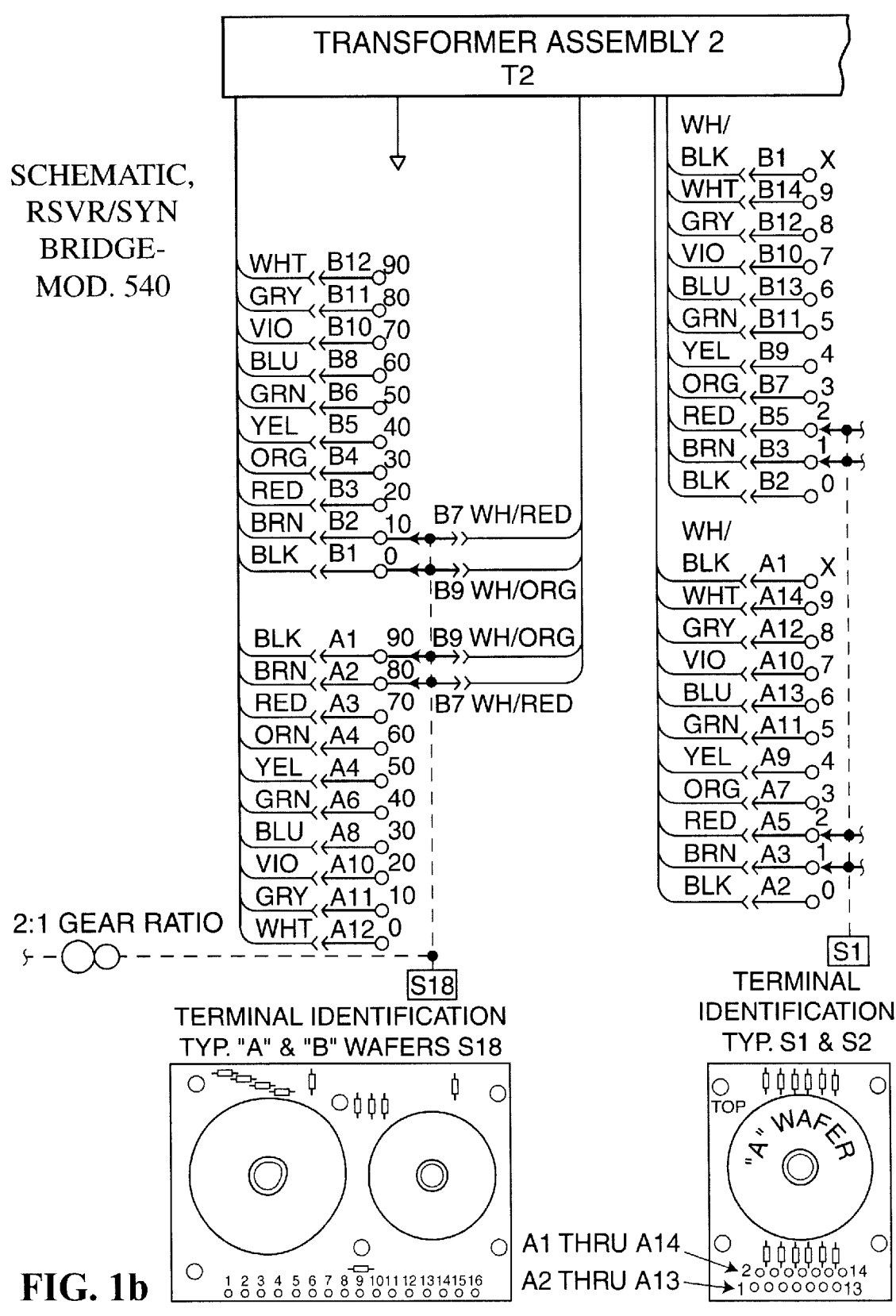
Figure 1C:
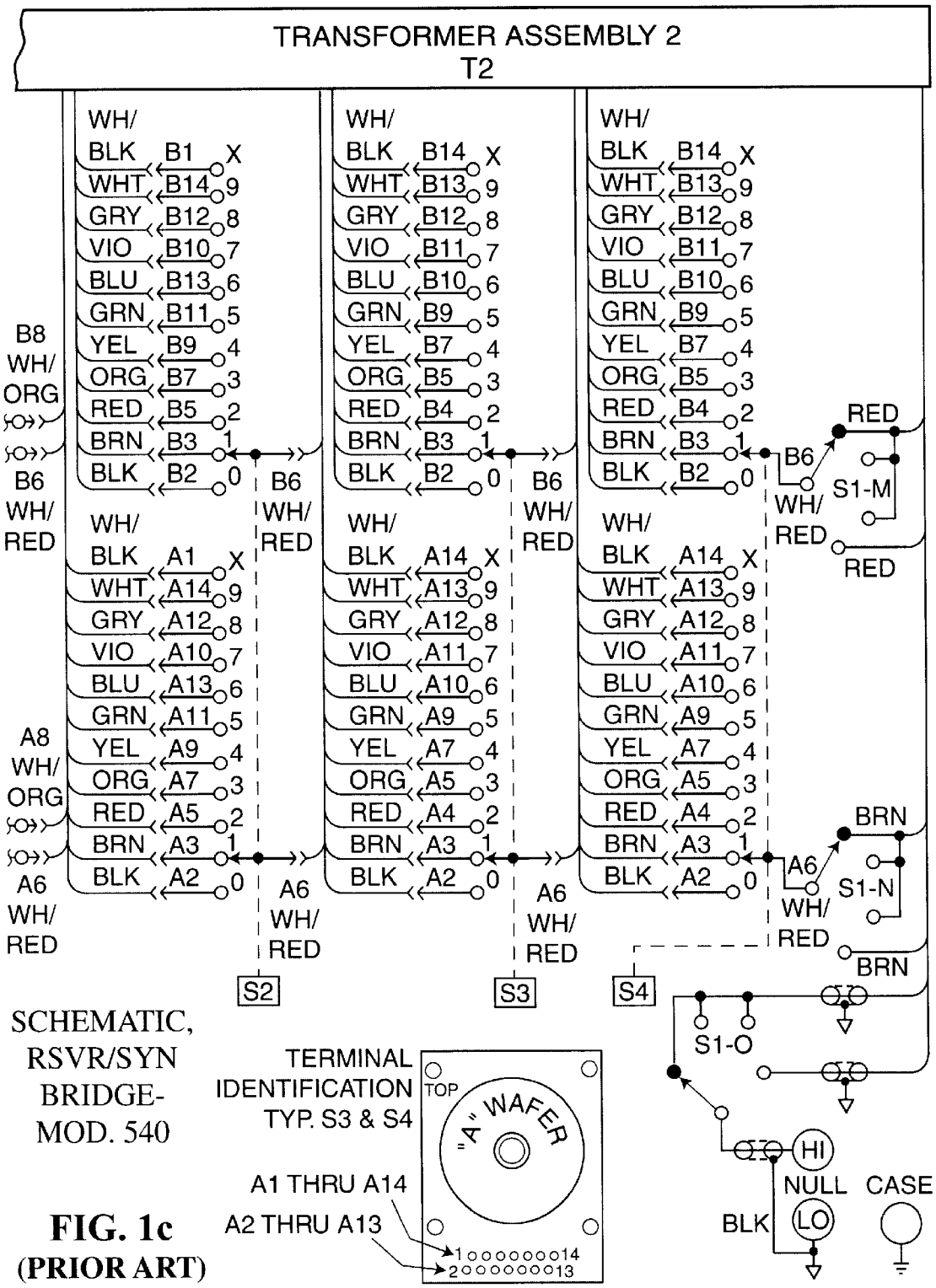
Figure 2A:
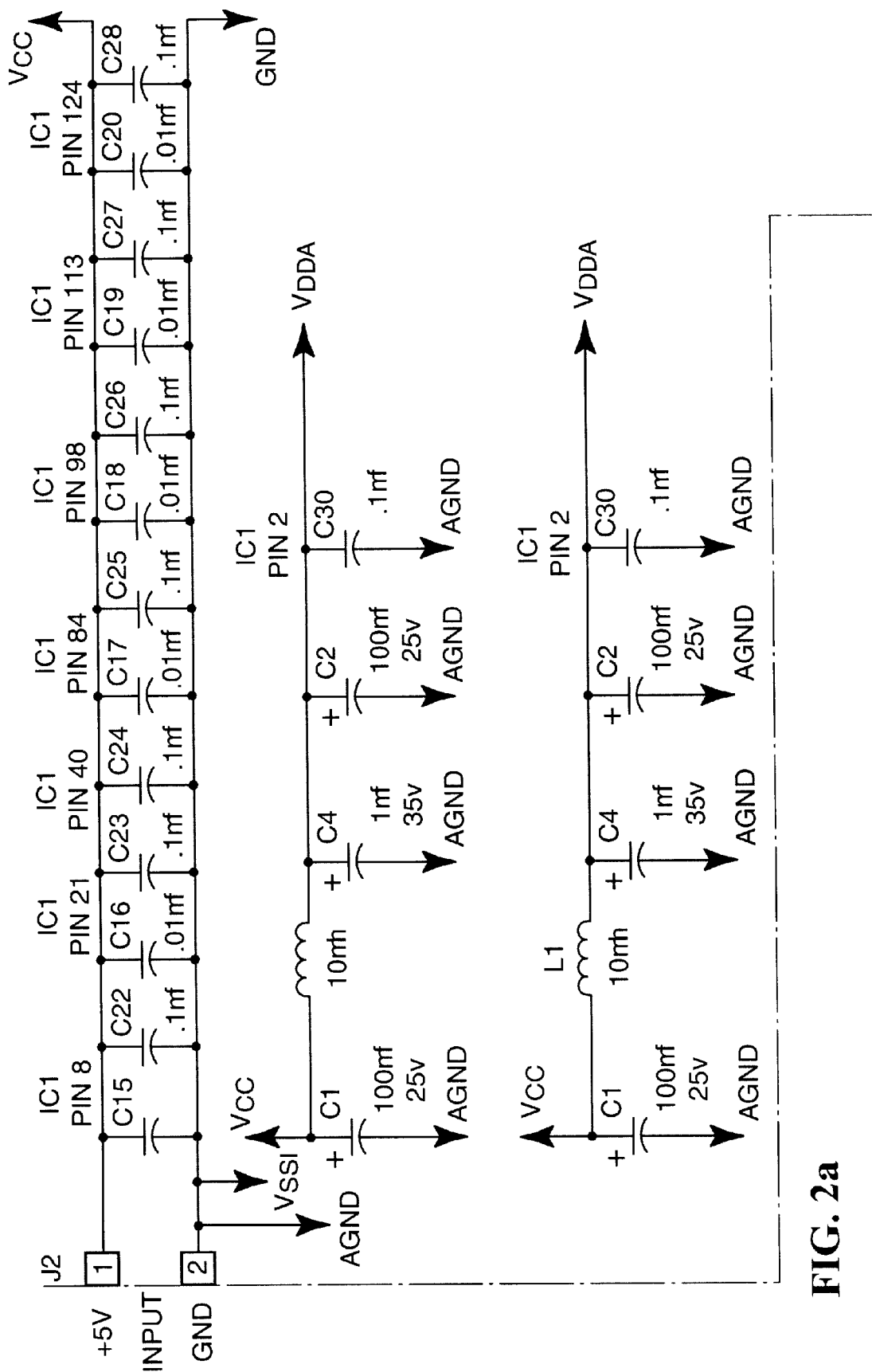
FIGS. 2a–2f are schematic representations of portions of the digital synchro/resolver bridge of the present invention.
Figure 2B:
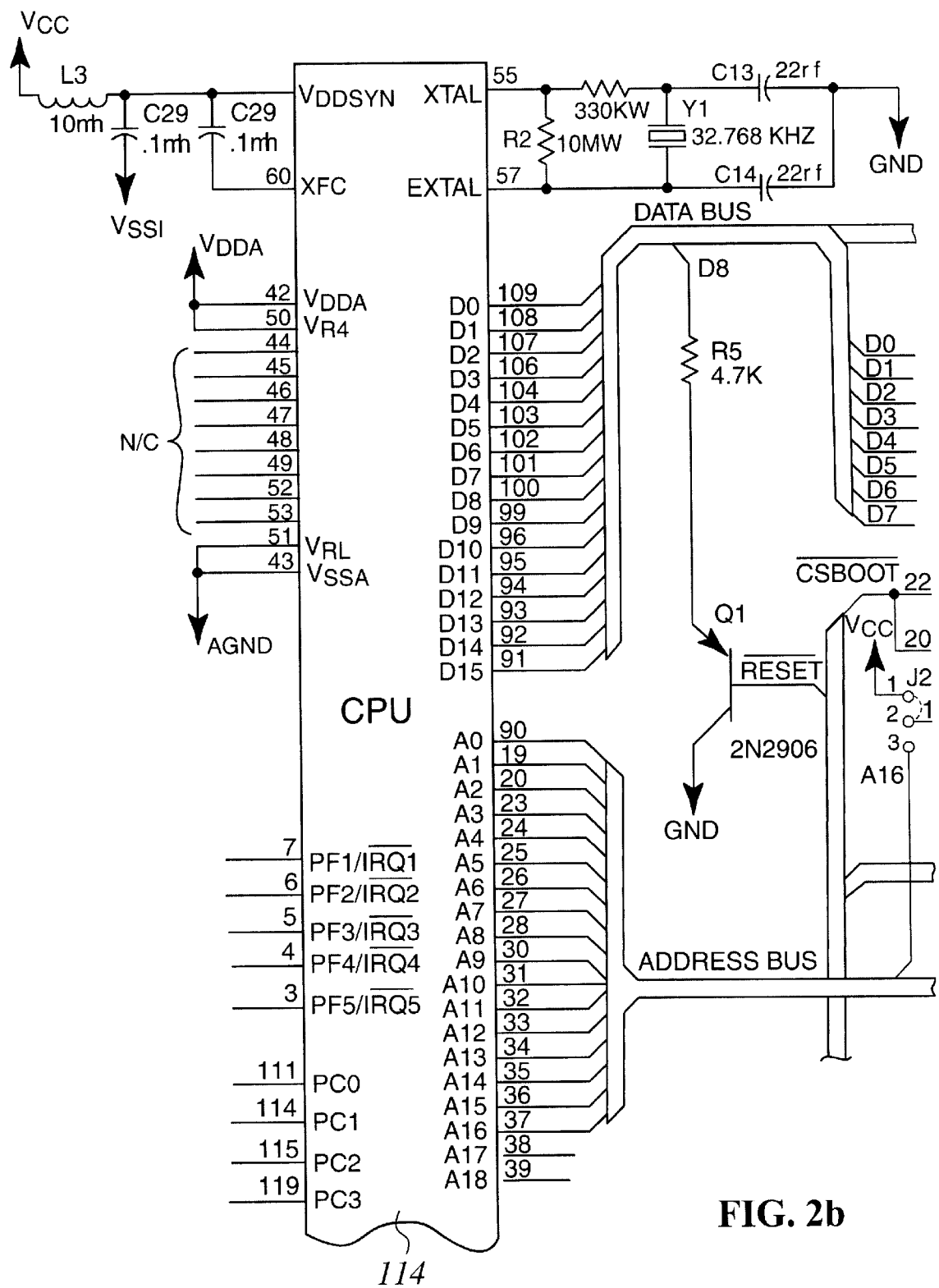
Figure 2C:
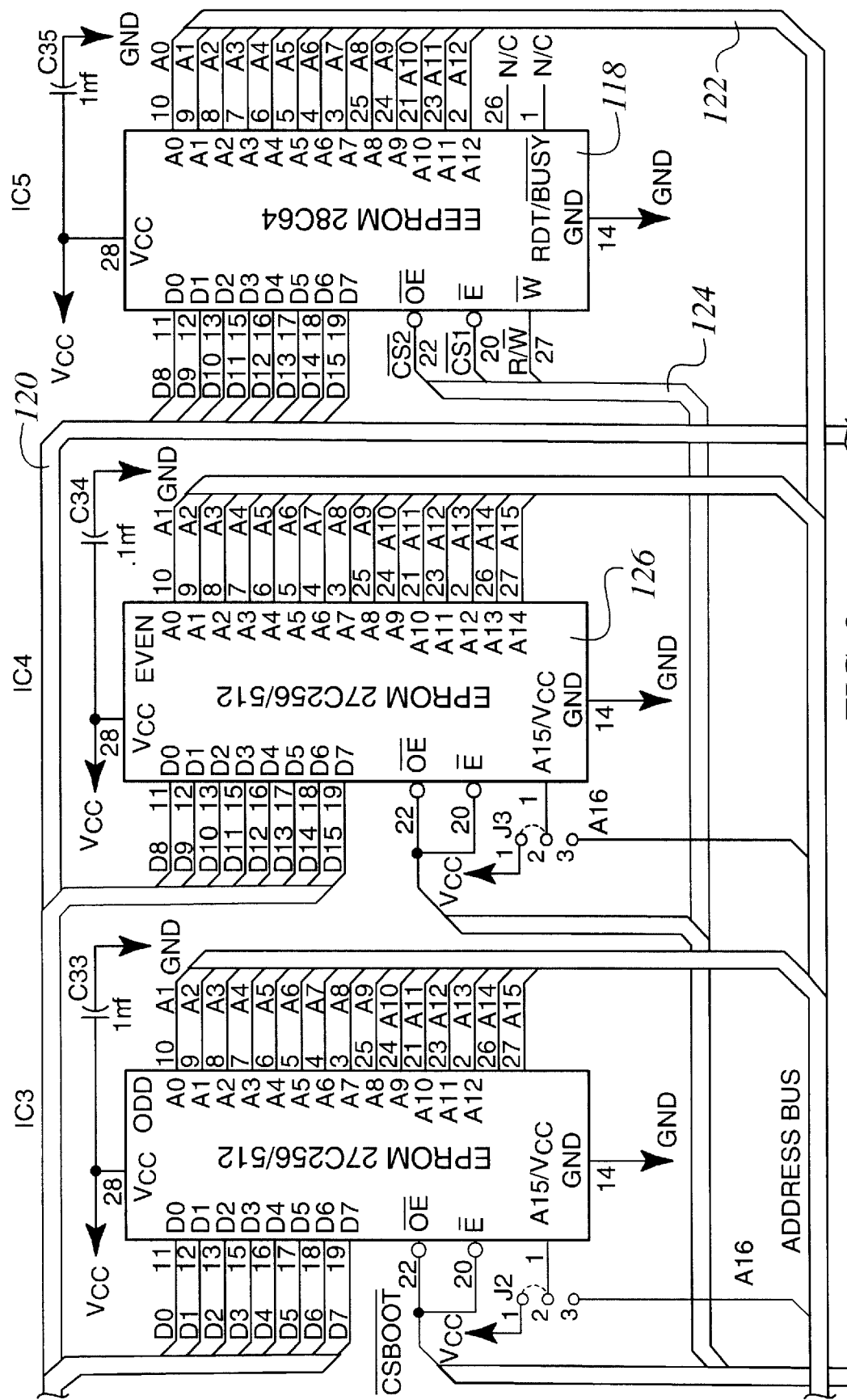
Figure 2D:
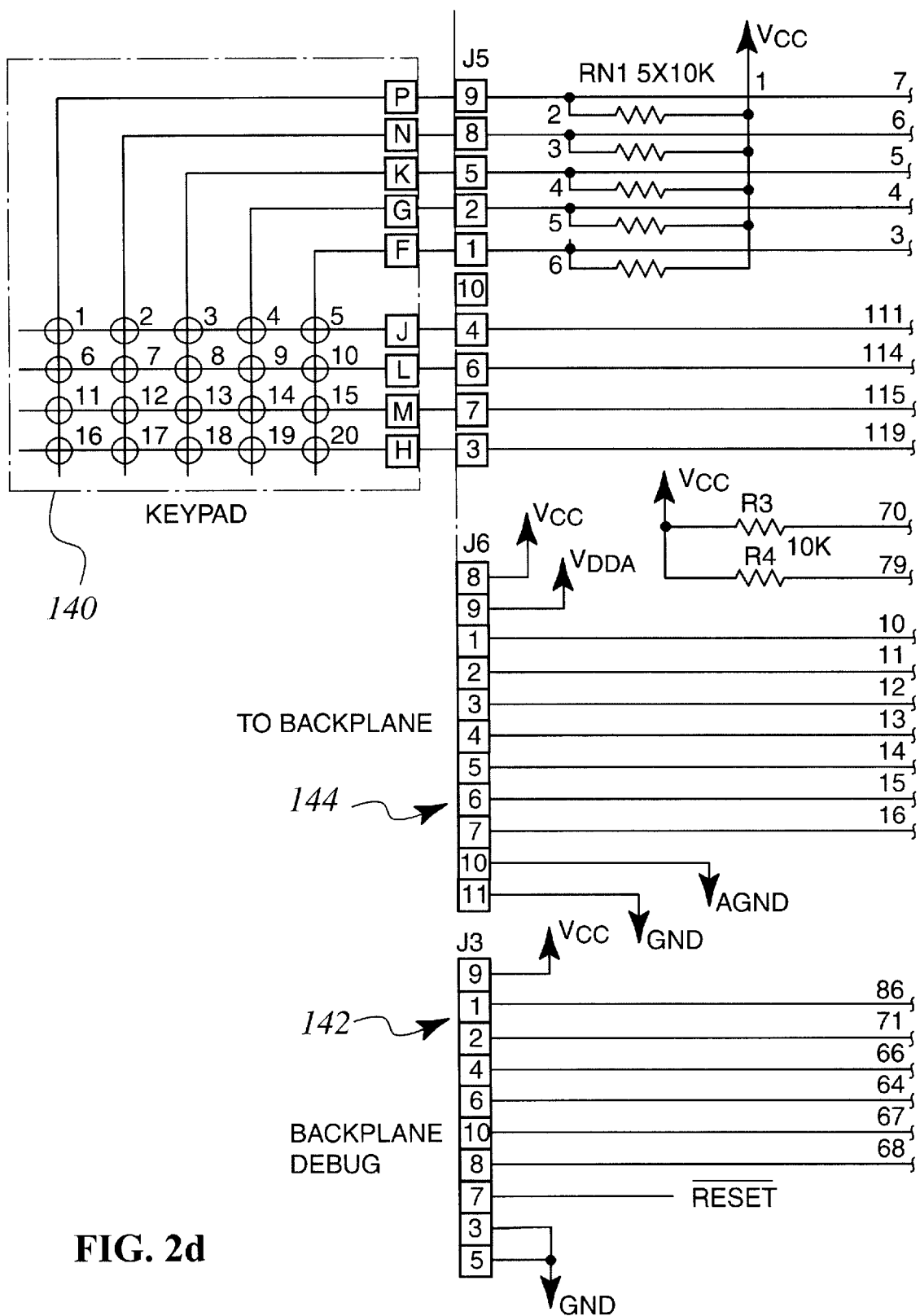
Figure 2E:
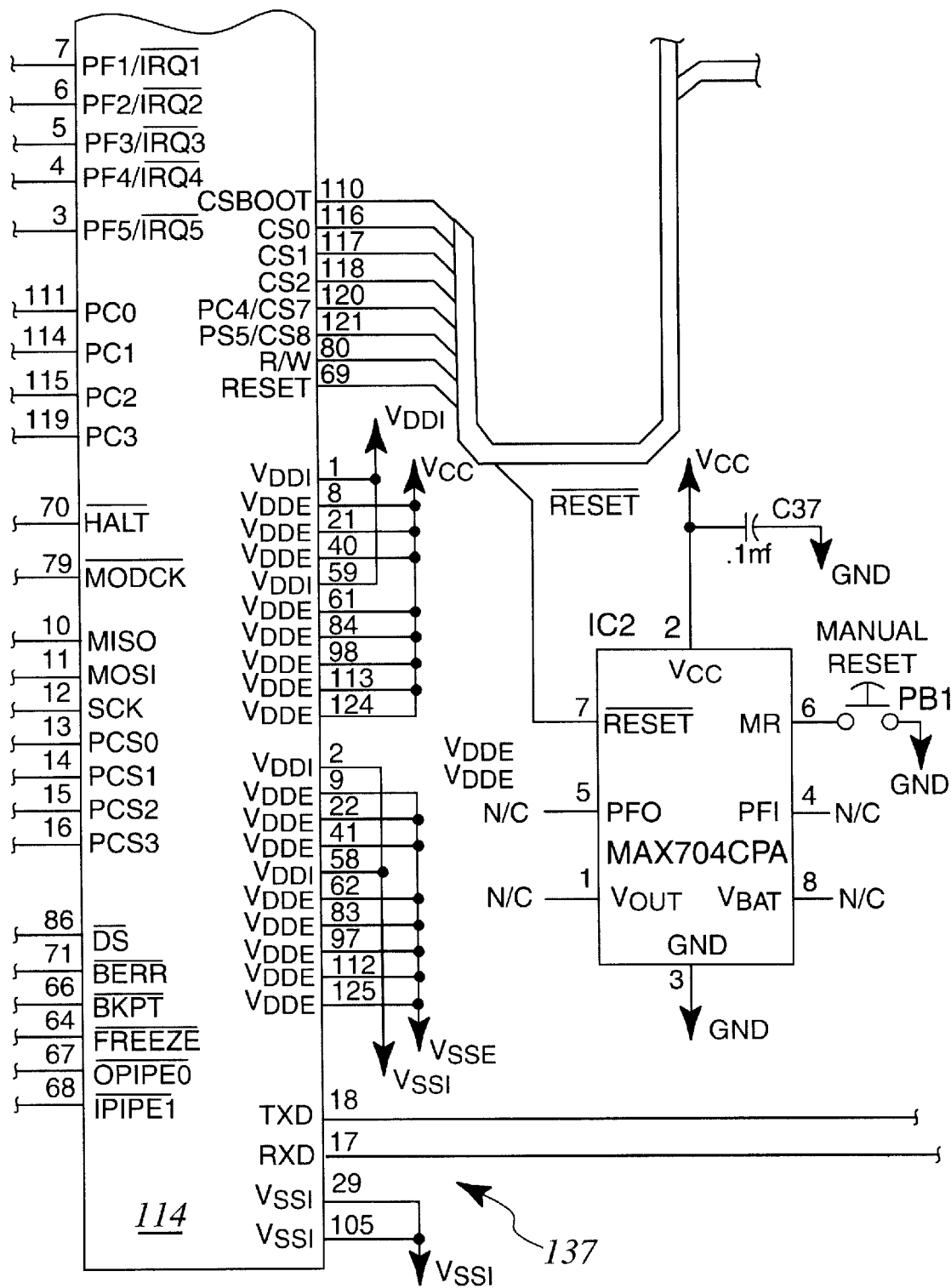
Figure 2F:
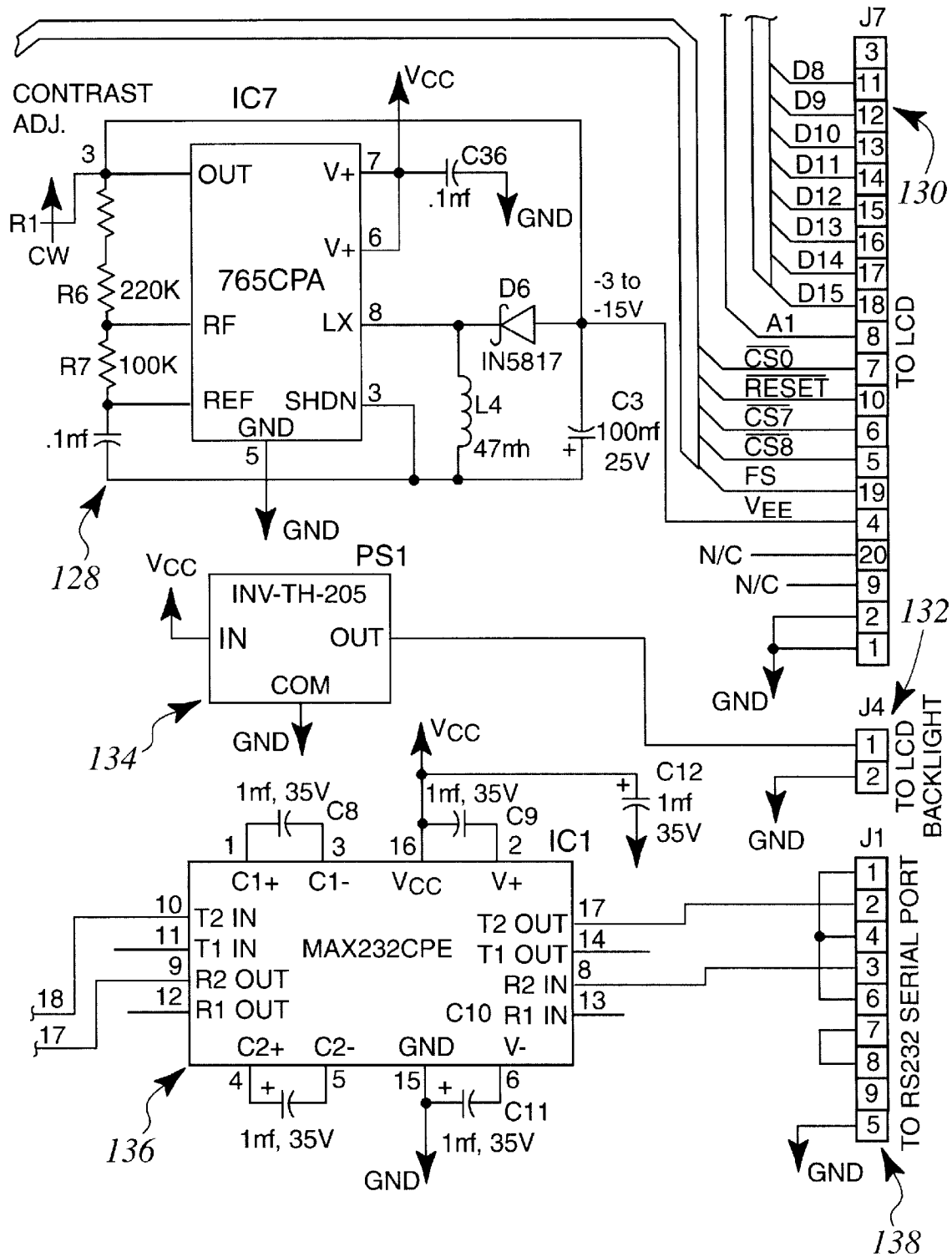
Figure 3A:
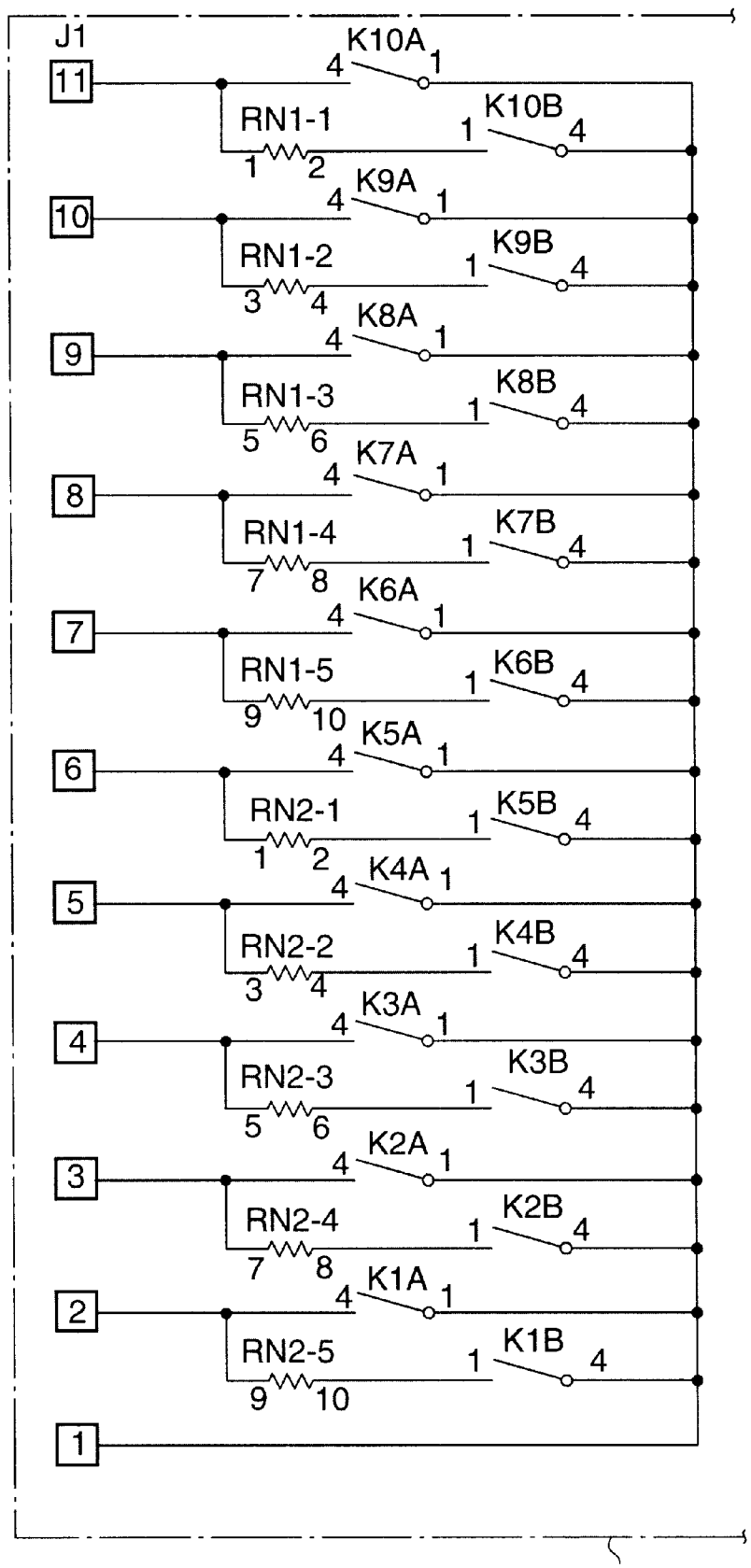
FIGS. 3a–3c are schematic representations of portions of a relay switch module portion of the digital synchro/resolver bridge of the present invention.
Figure 3B:
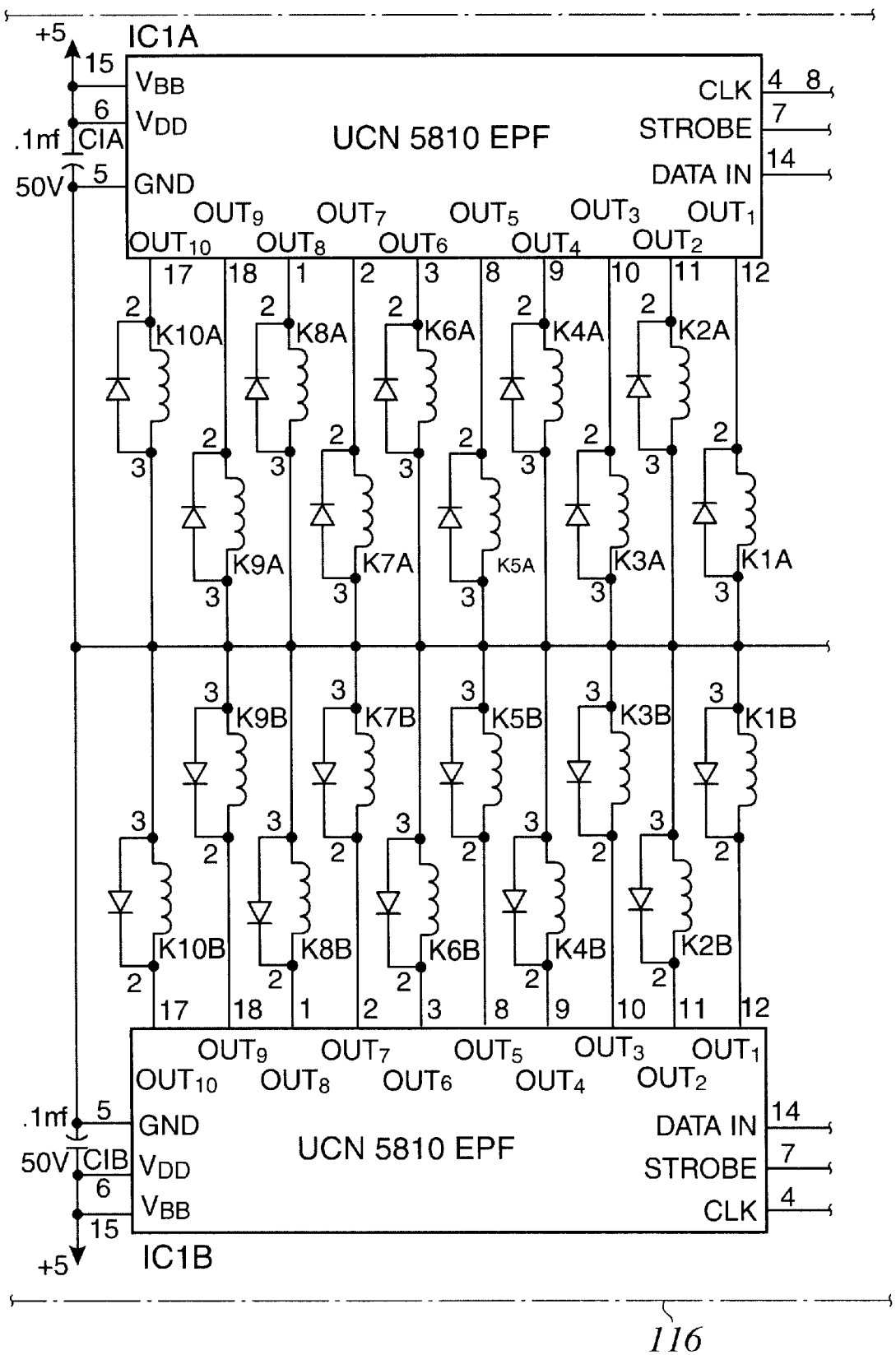
Figure 3C:
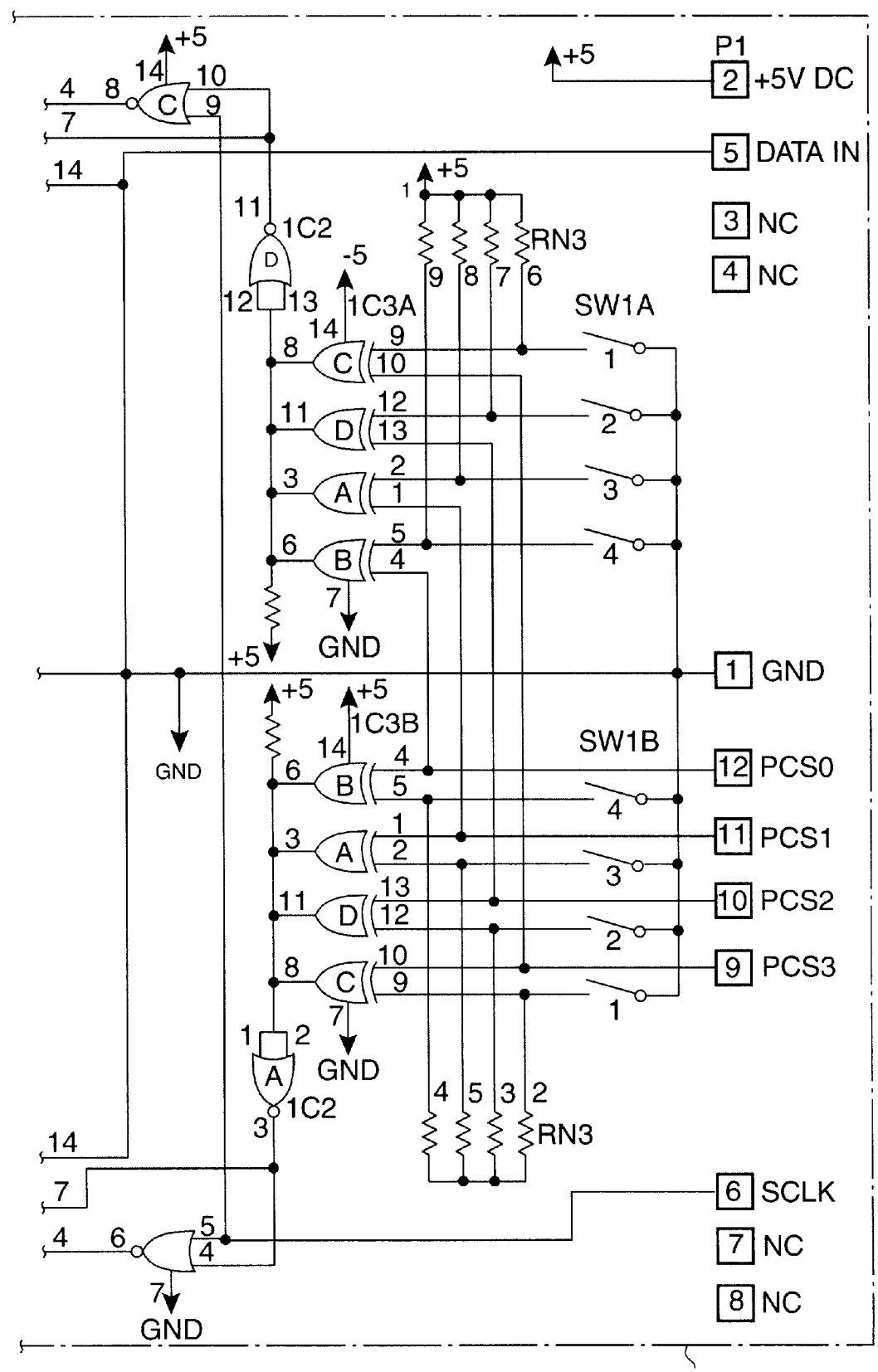
Figure 4:
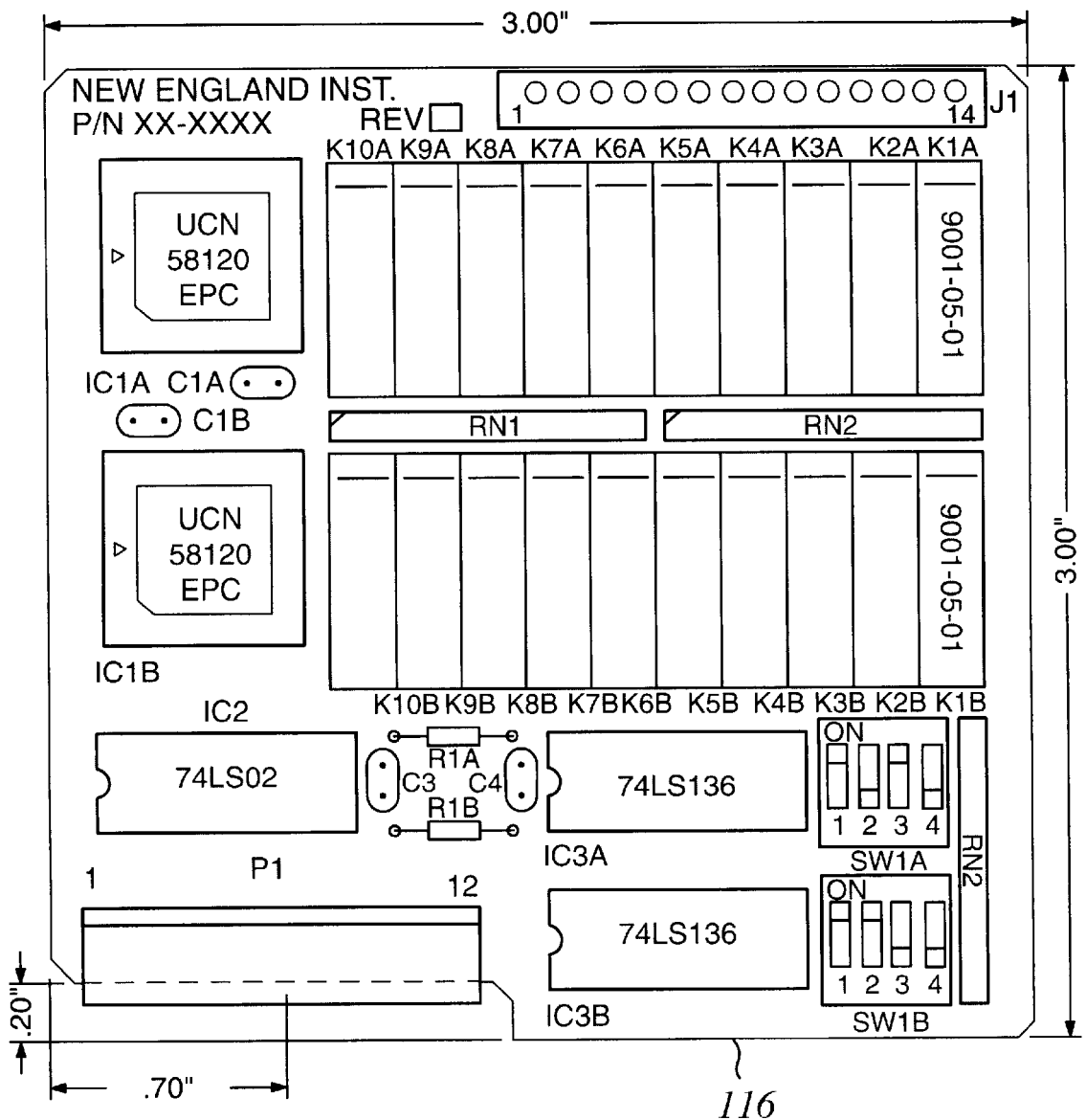
FIGS. 4 and 5 are elevational and plan views, respectively, of the relay switch module portions of FIG. 3.
Figure 5:
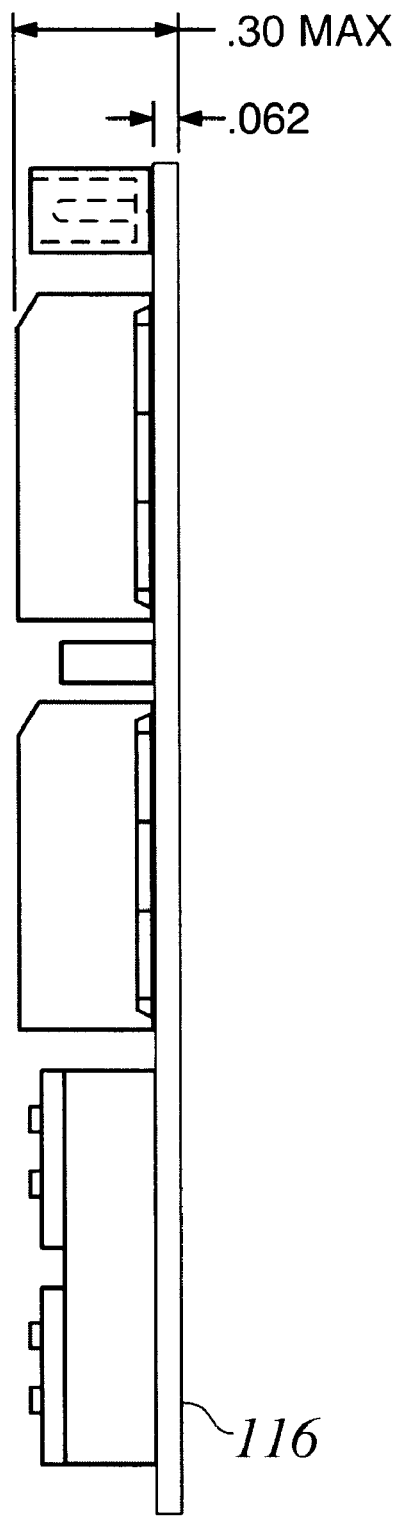
Figure 15:
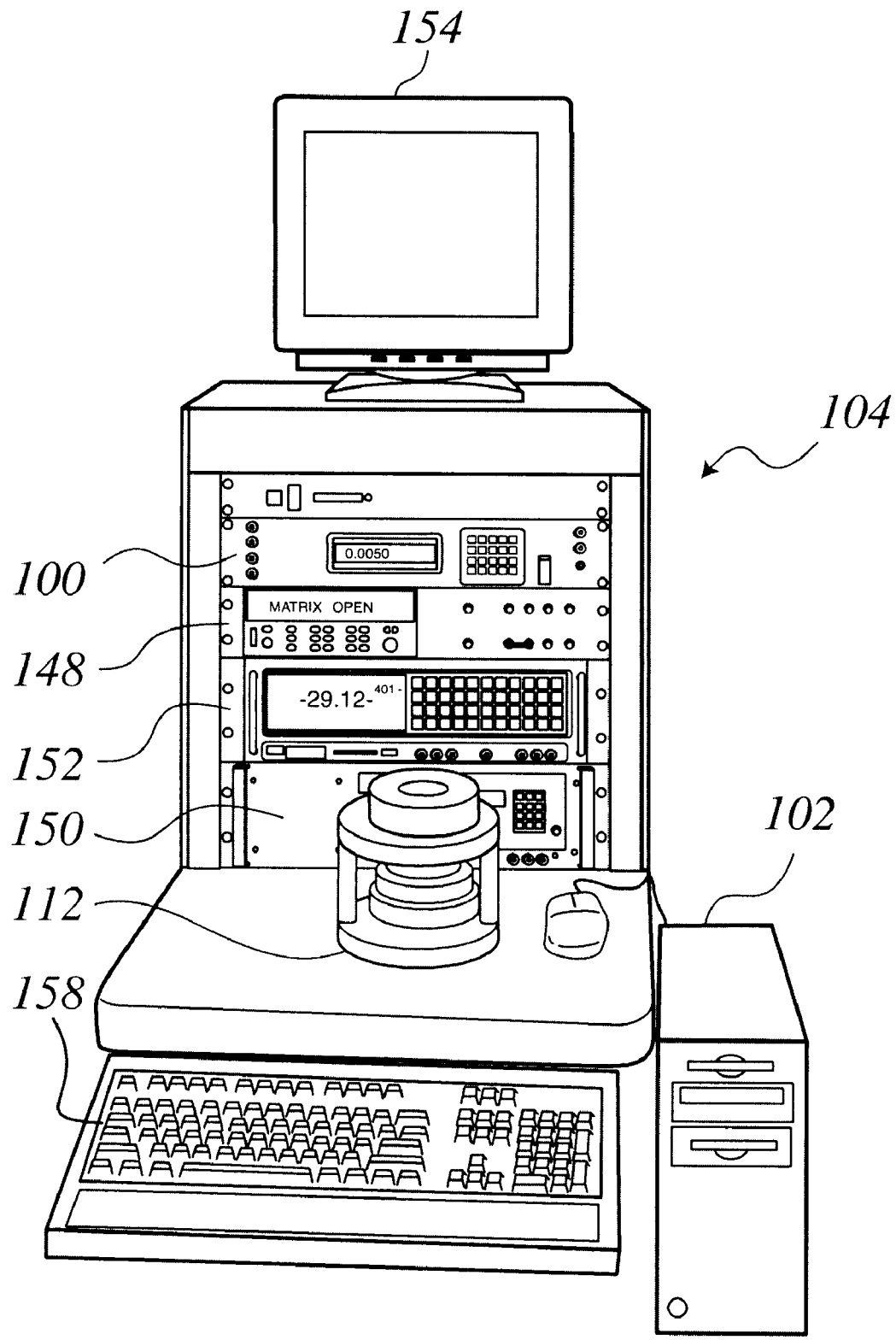
FIG. 15 is an elevational view of the automatic resolver test station of the present invention.

Turning now to FIG. 1, a conventional analog synchro/resolver bridge of a type known as model 540 sold by North Atlantic Industries, Inc. includes precision transformer assemblies 108 and 110 to form a voltage comparator bridge. Described briefly, a synchro or resolver 112 (FIG. 15) under test Generates two voltage signals (i.e., a sine signal and a cosine signal) from secondary transformer windings thereof. These signals bear a precise relationship (i.e., a voltage or phase ratio) to one another, which is determined by the angular position of the synchro or resolver unit 112 (FIG. 15). These signals are essentially back-fed to similar. secondary transformer windings of the bridge which are adjusted by use of taps disposed at predetermined spaced locations therealong too simulate the condition of the secondary windings of the resolver 112 (FIG. 15) at the predetermined angular position. These bridge windings thus essentially reverse or negate the sine/cosine ratio relationship generated by the resolver. The sine and cosine signals thus emerging from the primary windings of the bridge are then compared to one another utilizing a null voltage meter or a digital analyzing voltmeter. If these signals are identical (or otherwise bear a predetermined relationship) to one another after adjusting for the inherent phase offset between sine and cosine signals the output of the bridge is zero (0) thus indicating the absence of any error in the output of the resolver 112. Any unexpected difference between the characteristics of these two signals represents an error, which, if beyond a predetermined range, will represent a failure of the resolver 112 under test.

As will be discussed in greater detail hereinbelow, the synchro/resolver bridge 100 (FIGS. 15–17) of the present invention advantageously may be operated by the computer 102 (i.e., through the RS232 communication interface) or by an operator (i.e., by use of the user interface on the front panel 106). The bridge 100 substantially reduces the time required to switch to a desired angle and provides improved ease of use. Reliability is greatly improved relative to the prior art analog bridge due in part, to the power-on self-test capability.

As shown in FIGS. 2–5, the bridge 100 utilizes a microprocessor 114 in combination with an array of relay switch modules 116 (FIGS. 3–5) to effectively tap the transformer windings (not shown) corresponding to a desired angle. The relay switch modules 116 include a system of electromechanical relays (shown as K1A to K10A and K1B to K10B) to replace rotary switches used to manually operate conventional bridges such as those shown and described hereinabove.

Turning to FIG. 2, the bridge 100 includes an Electrically Erasable Programmable Read Only Memory (EEPROM) 118 coupled to the processor 114 by a databus 120, an address bus 122 and a control bus 124. The EEPROM 118 is used to store various known calibration and test constants so that they are saved when the system is off (i.e., powered down), while also permitting these constants to be changed, if necessary, by a user.

A plurality of Erasable Programmable Read Only Memory (EPROM) devices 126 is similarly coupled to the processor 114. The program code and relay switch information for the bridge 100 is stored in these EPROM devices 126, as will be discussed in greater detail hereinbelow. A liquid crystal display control circuit 128 is coupled to an LCD port 130, the LCD port being coupled to the processor 114 by the databus 120 and the control bus 124. An LCD backlight port is coupled to an LCD backlight power supply 134.

A serial port controller 136 is coupled to a Serial Communication Interface 'SCI' 137 (i.e., TXD and RXD pins 17 and 18) of processor 114 and to serial port 138. In a preferred embodiment serial port 138 is a conventional RS232 port. A digital user input device 140 such as a digital keypad, is coupled to the processor 114. A debug port 142 is also coupled to processor 114, which is adapted for being coupled to a system emulator or debugger for debugging or reconfiguring program code embodied in the EPROM 126. A relay switch module port 144 (i.e., a Serial Peripheral Interface 'SPI') is also coupled to the processor 114. Relay switch modules 116 are shown in greater detail in FIGS. 3–5.

Figure 6:
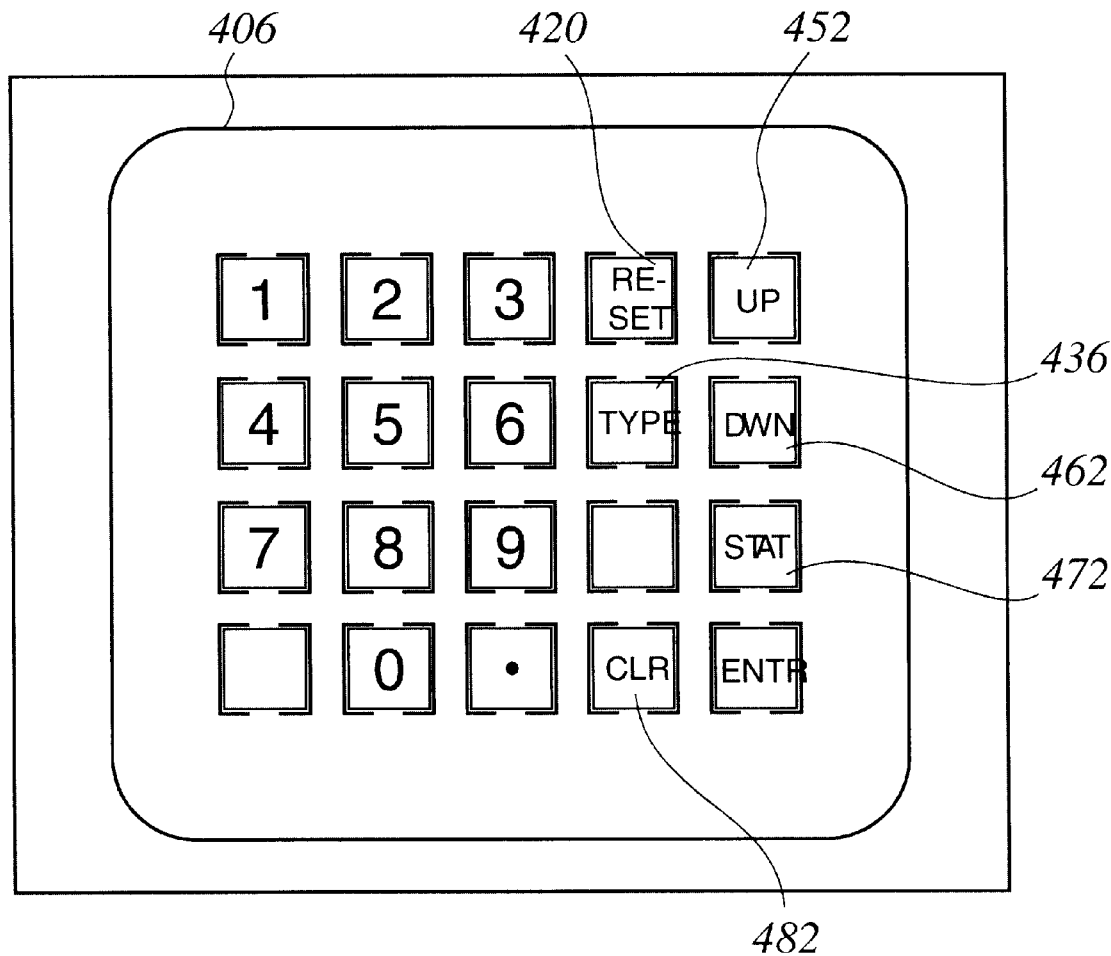
FIG. 6 is an elevational representation of a portion of the digital synchro/resolve bridge of the present invention.

Various operational routines of the bridge 100 (i.e., for stand-alone use) are shown in the flowcharts of FIGS. 7–13, making reference to components of the front panel 106 shown in FIGS. 6 and 16. These functional routines are implemented by computer readable program code embodied within EPROM 126. Additional aspects of this computer readable program code are described by the flowchart of FIG. 14 and disclosed in greater detail in the program code listing incorporated herein as Appendix A. Some parameters of this program code include the following Command Set, Command Examples, Query Returns System Settings and System Commands.

| COMMAND SET | | |
|---|---|---|
| 1. | ANG | [SETS ANGLE] |
| 2. | CRSTP | [SETS COARSE STEP] |
| 3. | FNSTP | [SETS FINE STEP] |
| 4. | STPSZ | [SETS STEP SIZE CRS, FIN, TRM] |
| 5. | INCC | [INCREMENTS COARSE STEP] |
| 6. | INCF | [INCREMENTS FINE STEP] |
| 7. | DECC | [DECREMENTS COURSE STEP] |
| 8. | DECF | [DECREMENTS FINE STEP] |
| 9. | INCT | [INCREMENTS TRIM BY 1] |
| 10. | DECT | [DECREMENTS TRIM BY 1] |
| 11. | TRMCENT | [SETS TRIM DGTS TO 50] |

| COMMAND EXAMPLES | |
|---|---|
| SET ANG 359.9999 | [SETS ANGLE TO 359.9999 DEG] |
| SET CRSTP 16 | [SETS COARSE STEP TO 16 DEG.] |
| SET FNSTP 1 | [SETS FINE STEP TO .0001 DEG.] |
| SET FNSTP 1000 | [SETS FINE STEP TO .1000 DEG.] |
| SET STPSZ CRS | [SETS STEP SIZE TO COARSE] |
| SET STPSZ FIN | [SETS STEP SIZE TO FINE] |
| INCC | [INCREMENTS ONE COARSE STEP] |
| INCF | [INCREMENTS ONE FINE STEP] |
| QUERRY RETURNS SYSTEM SETTINGS | |
| ANG? | [RETURNS ANGLE POSITION] |
| CRSTP? | [RETURNS COURSE STEP] |
| FNSTP? | [RETURNS FINE STEP] |
| STPSZ? | [RETURNS STEP MODE] |
| SET? | [RETURNS ALL SETTINGS] |
| LLO? | [LOCKS OUT FRONT PANEL] |
| DSP? | [TURNS DISPLAY ON AND OFF] |
| AUD? | [RETURN AUDIBLE ALARM] |
| SYSTEMS COMMANDS | |
| RMT | [PLACE BRIDGE IN ROMOTE CONTROL MODE] |
| LLO | [LOCKS OUT FRONT PANEL] |
| LOCAL | [PLACES CONTROL IN LOCAL MODE] |
| DSP ON or OFF | [TURNS DISPLAY ON AND OFF] |
| AUD ON or OFF | [TURNS AUDIO ALARM ON AND OFF] |
| RST | [RESETS MP TO DEFAULT SETTING] |
| SAV | [SAVE CURRENT SETTINGS] |
| INI | [RESTORES ORIGINAL DEFAULT SETTINGS] |

Figure 7:
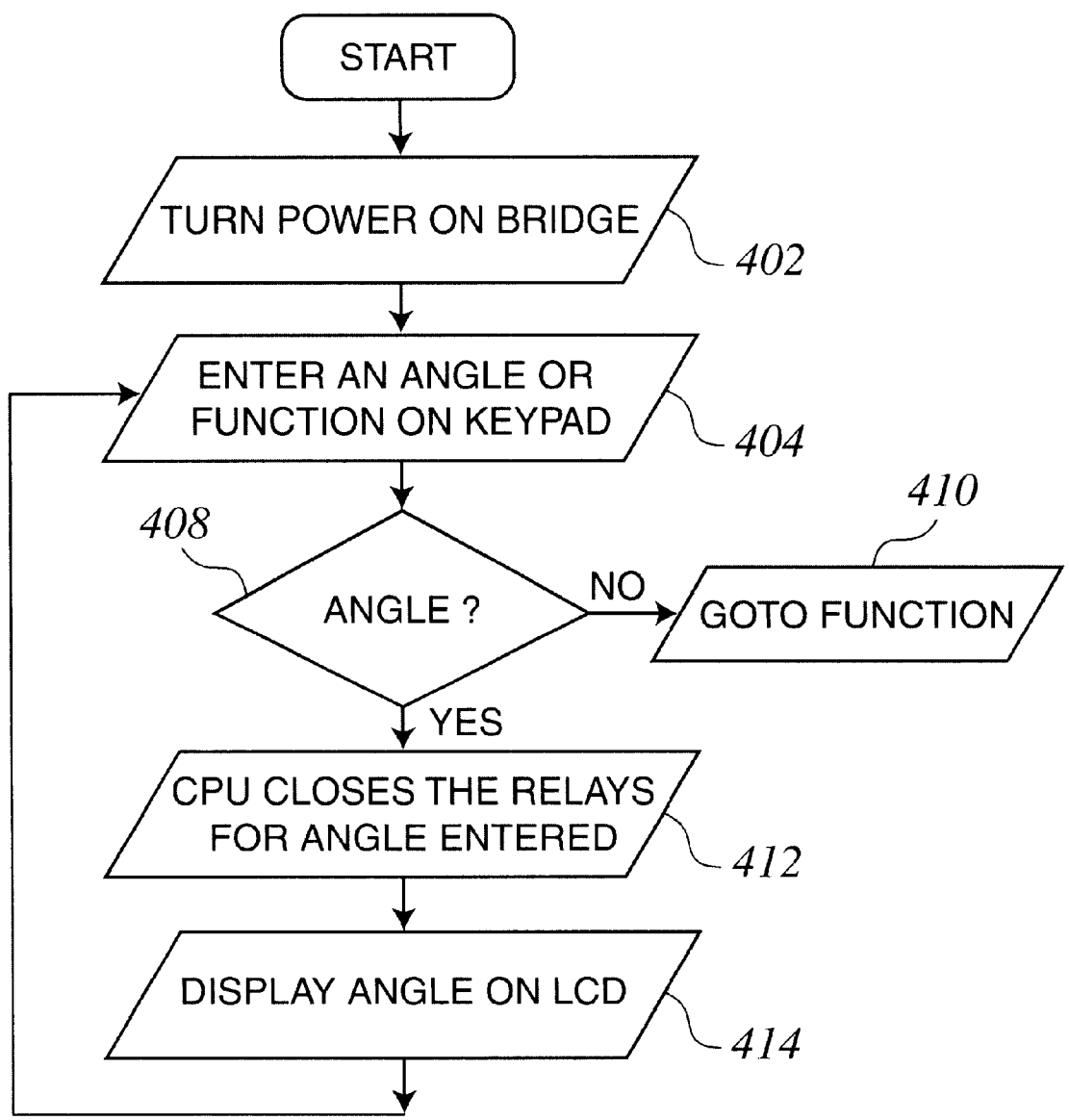
FIGS. 7–13 are flow chart representations of the operation of the digital synchro/resolver bridge of the present invention.

Turning to FIG. 7, in one routine, power may be initially turned on by the user actuating the power switch 400 (FIG. 16) at 402. A user may then enter 404 an angle or a function using keyboard 406 (FIGS. 6 and 16). The routine then determines 408 whether an angle was entered. If an angle was not entered, the routine branches 410 to the function routines described hereinbelow with respect to FIGS. 8–11.

In the event the routine determines than an angle was entered, the routine instructs the relays associated with the angle entered to be closed 412, thereby effectively digitally setting the taps of the coils of the bridge 100. The angle is displayed 414 on the display 416 (FIG. 16). The routine then branches back to step 404 for input of a different angle or function.

Figure 8:
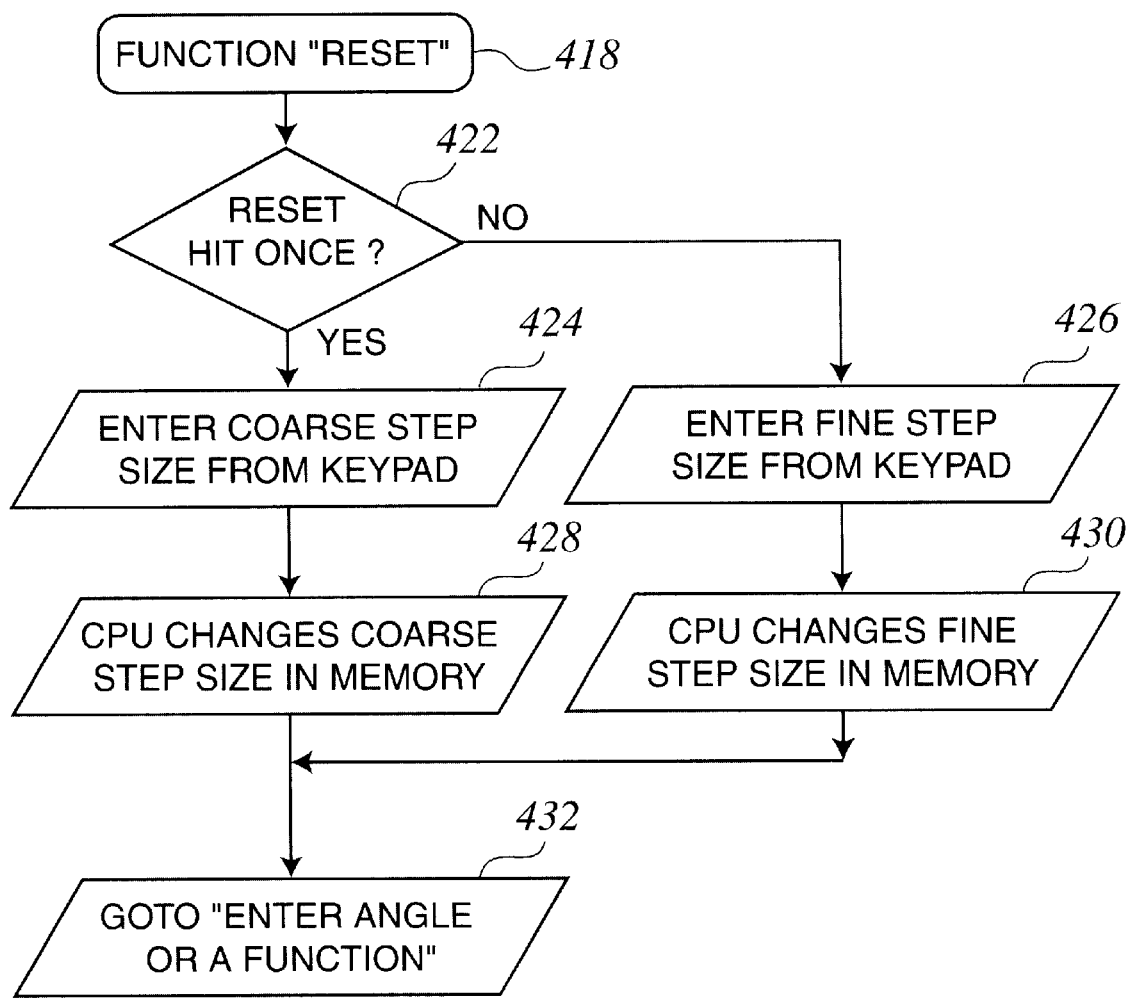

Turning to FIG. 8, the function "Reset" is actuated 418 by a user depressing the reset button 420 (FIG. 6). The routine determines 422 whether the button 420 was actuated, and then enables a user to enter "coarse" step size 424 or "fine" step size 426. The CPU of the bridge 100 then implements the respective step size at 428 or 430, and then branches at 432 to step 404 (FIG. 7).

Figure 9:
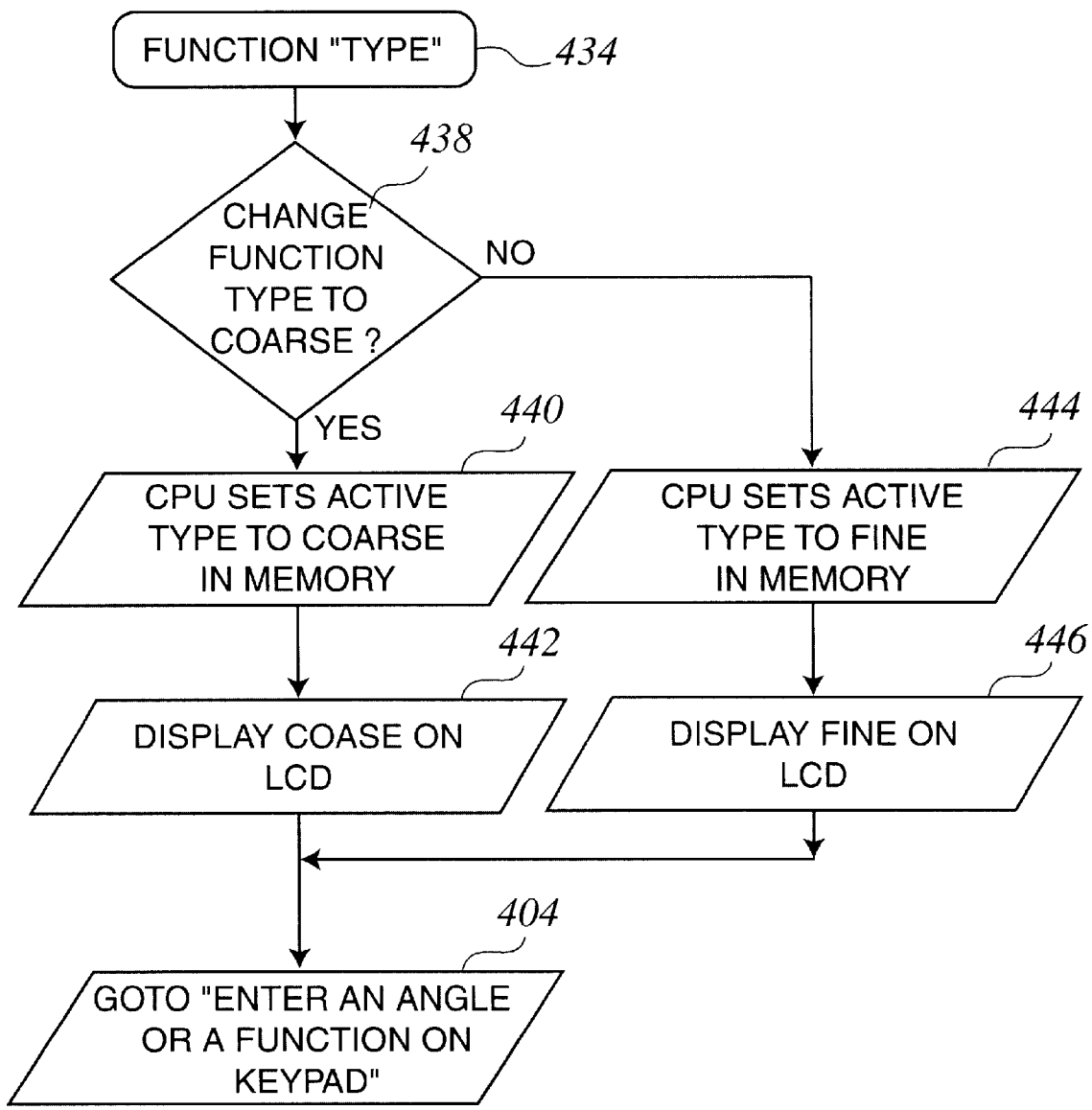
Figure 10:
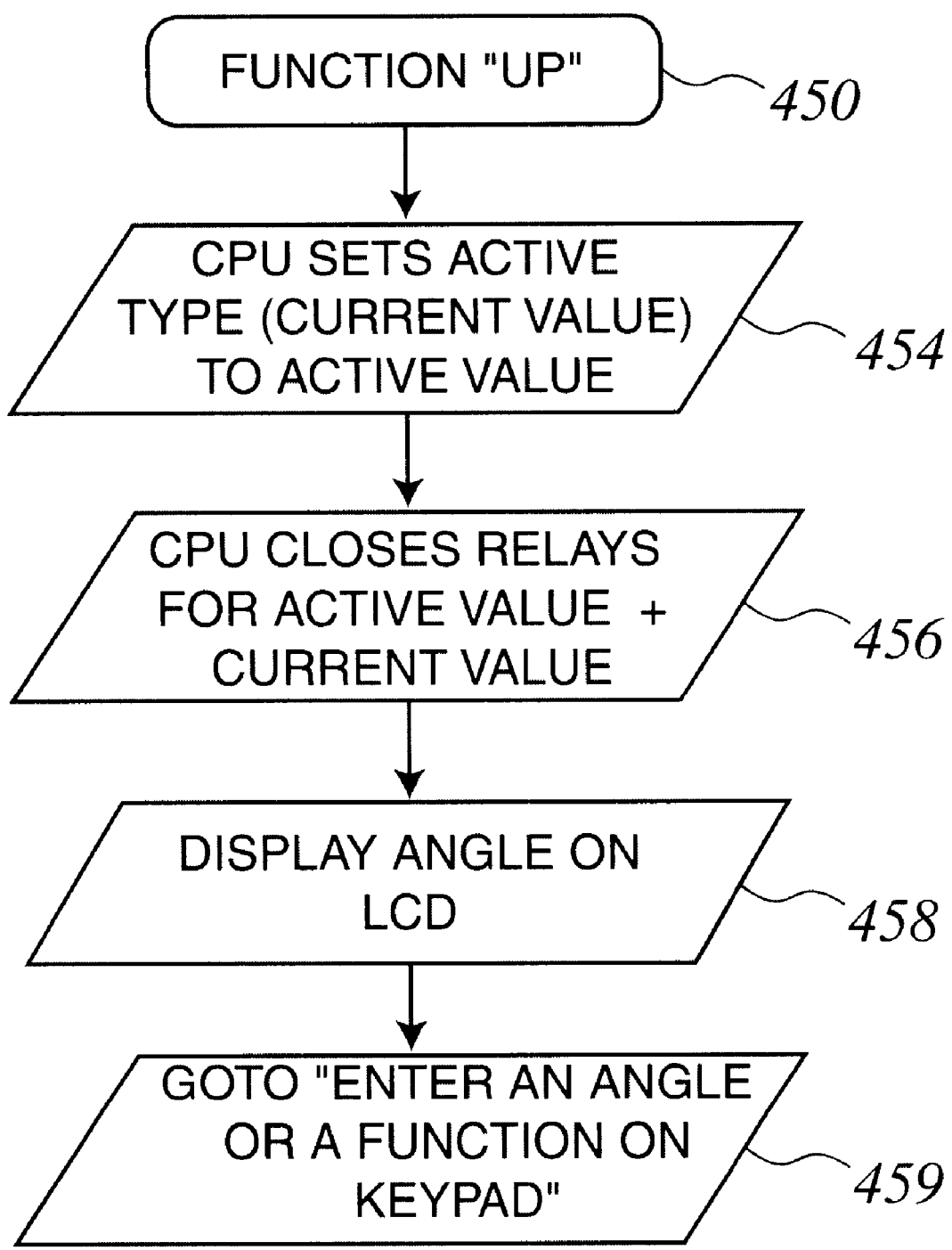

Turning to FIG. 9, the function "Type" is described. This function is called by the user actuating 434 "Type" button 436 (FIG. 6). The routine then queries 438 whether the function type is to be changed to "course." If the type is to be changed, the active type is set 440 to "coarse" in memory and displayed 442 on the display 416 (FIG. 16). Alternatively, if the function type was not to be changed, the routine branches from 438 to set 444 the active type to "fine" in memory and displayed 446 on the display 416. The routine then branches at 448 to step 404 as shown in FIG. 7. As shown in FIG. 10, the function "Up" is initiated by actuating 450 the Up button 452 (FIG. 6). The CPU adds 454 an active type (current value) to the active value, and closes 456 relays for the active value plus current value. The angle is displayed 458 on the LCD display 416 (FIG. 16). The routine then branches 459 to step 404 (FIG. 7).

Figure 11:
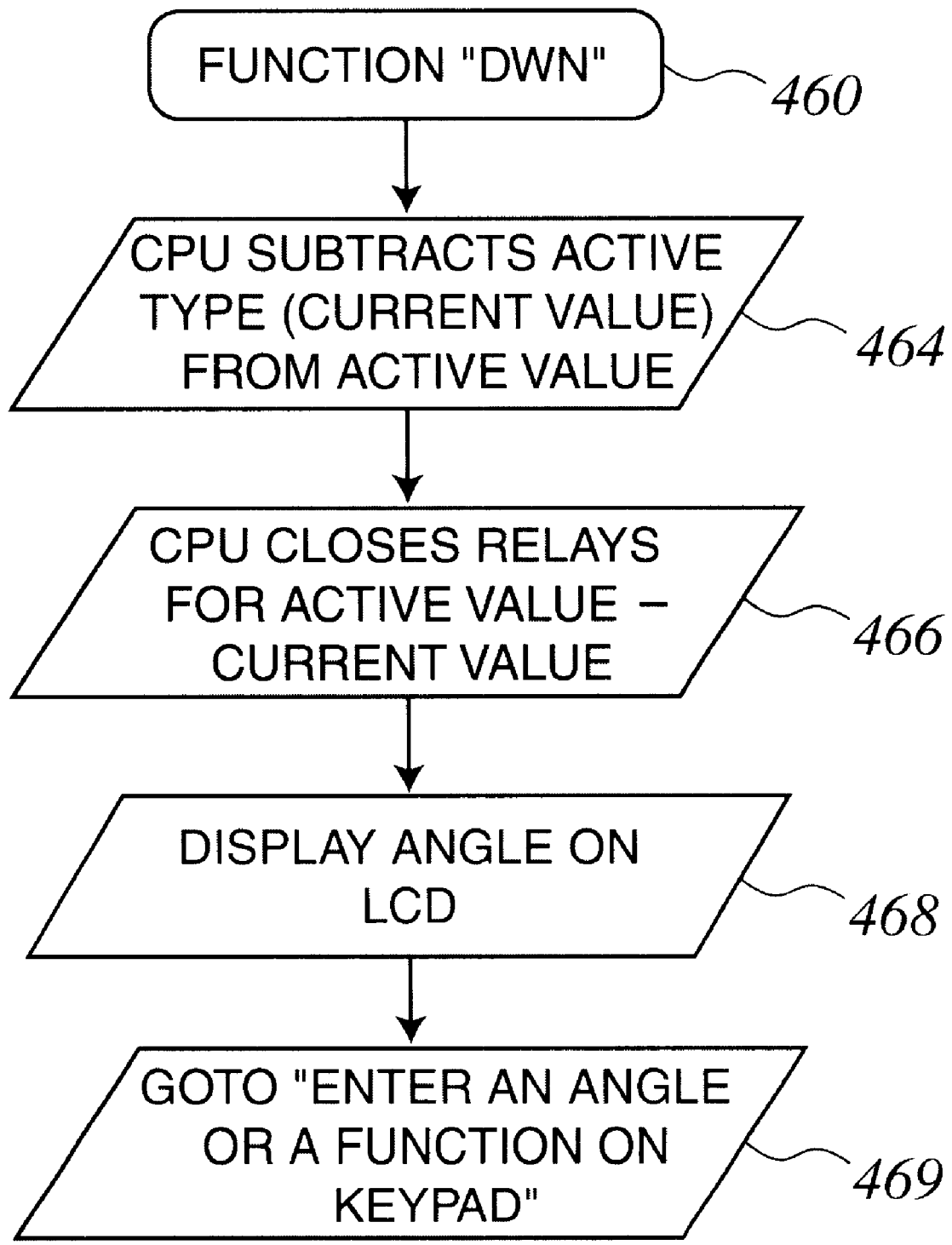

As shown in FIG. 11, the function "Down" is initiated by actuating 460 the Down button 462 (FIG. 6). The, CPU then subtracts 464 an active type (current value) from the active value, and closes 466 relays for the active value minus current value. The angle is displayed 468 on the LCD display 416 (FIG. 16). The routine then branches 469 to step 404 (FIG. 7).

Figure 12:
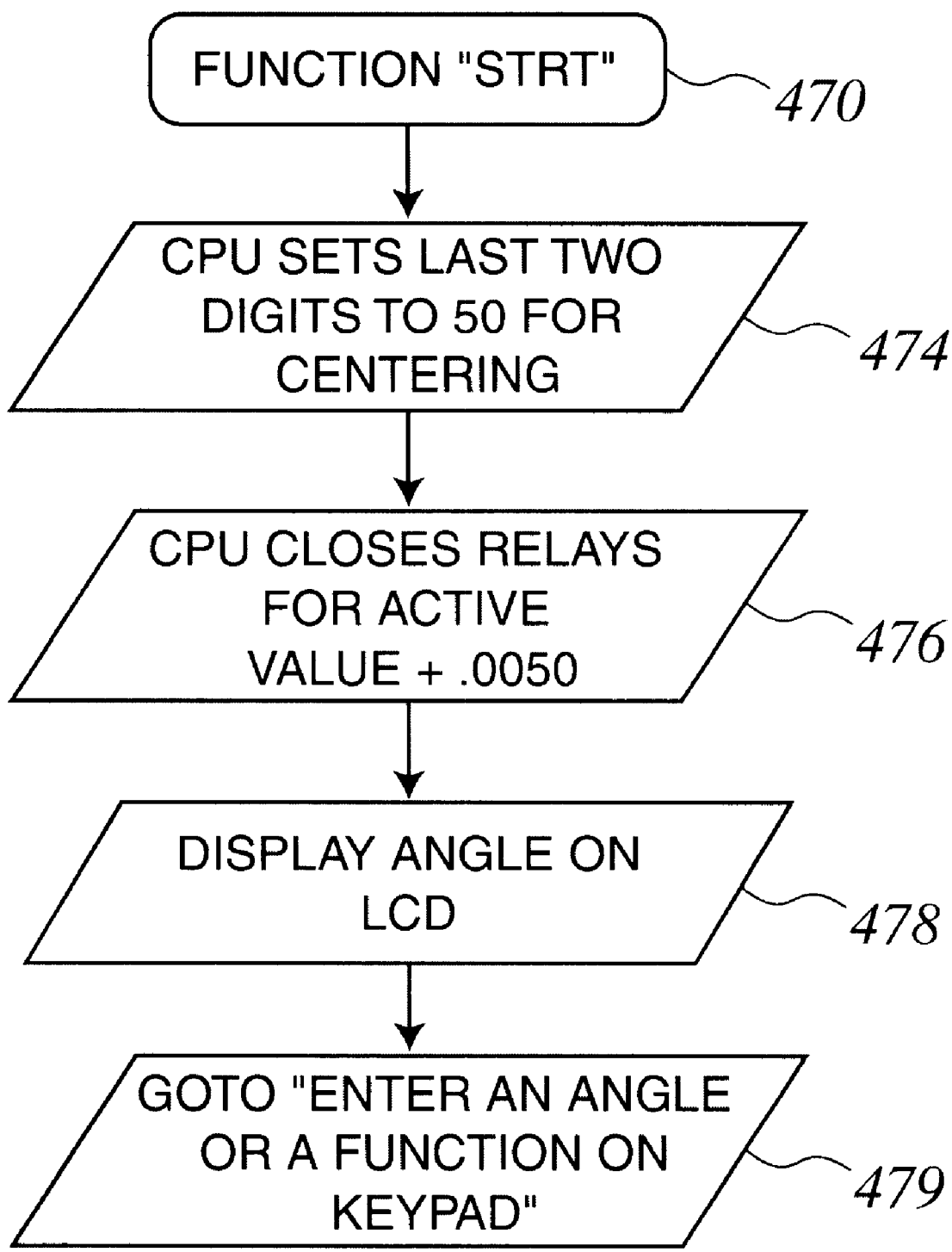

As shown in FIG. 12, the start function "STRT" is initiates by actuating 470 the STRT button 472 (FIG. 6). This function preferably starts at a value of 0.0050 (as discussed below) to permit the user to "trim" by small + or − increments to zero the output. The CPU then sets 414 the last two digits to 50 for centering. The relays are then closed 476 for the active value plus 0.0050. The angle is displayed 478 on the LCD display 416 (FIG. 16). The routine then branches 479 to step 404 (FIG. 7).

Figure 13:
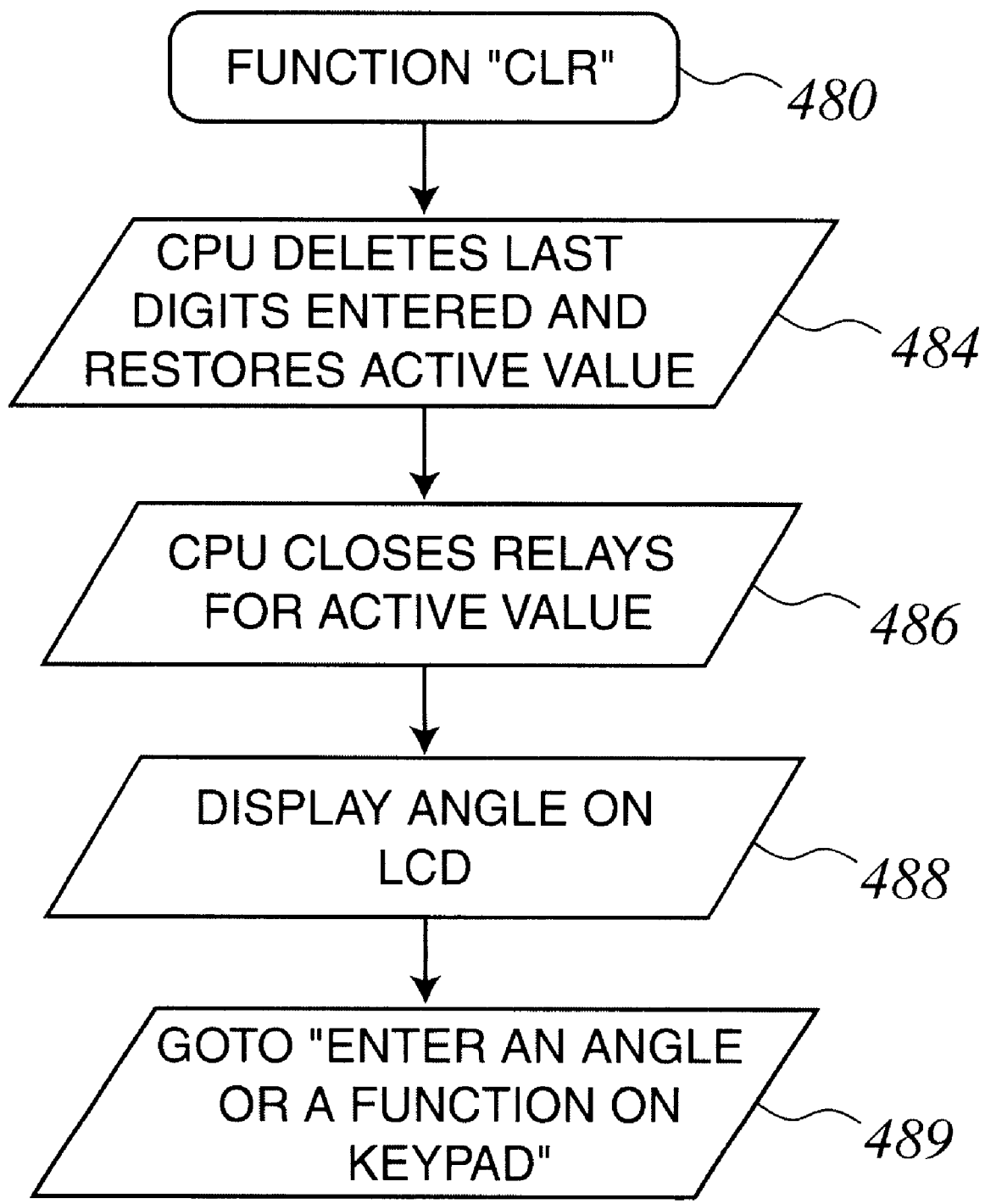

Turning now to FIG. 13, the clear function "CLR" is initiated by actuating 480 the CLR button 482 (FIG. 6) The routine deletes 484 the last digits entered and restores the active value. The relays are then closed 486 for the active value. The angle is displayed 488 on the LCD display 416 (FIG. 16). The routine then branches 489 to step 404 (FIG. 7).

Figure 14A:
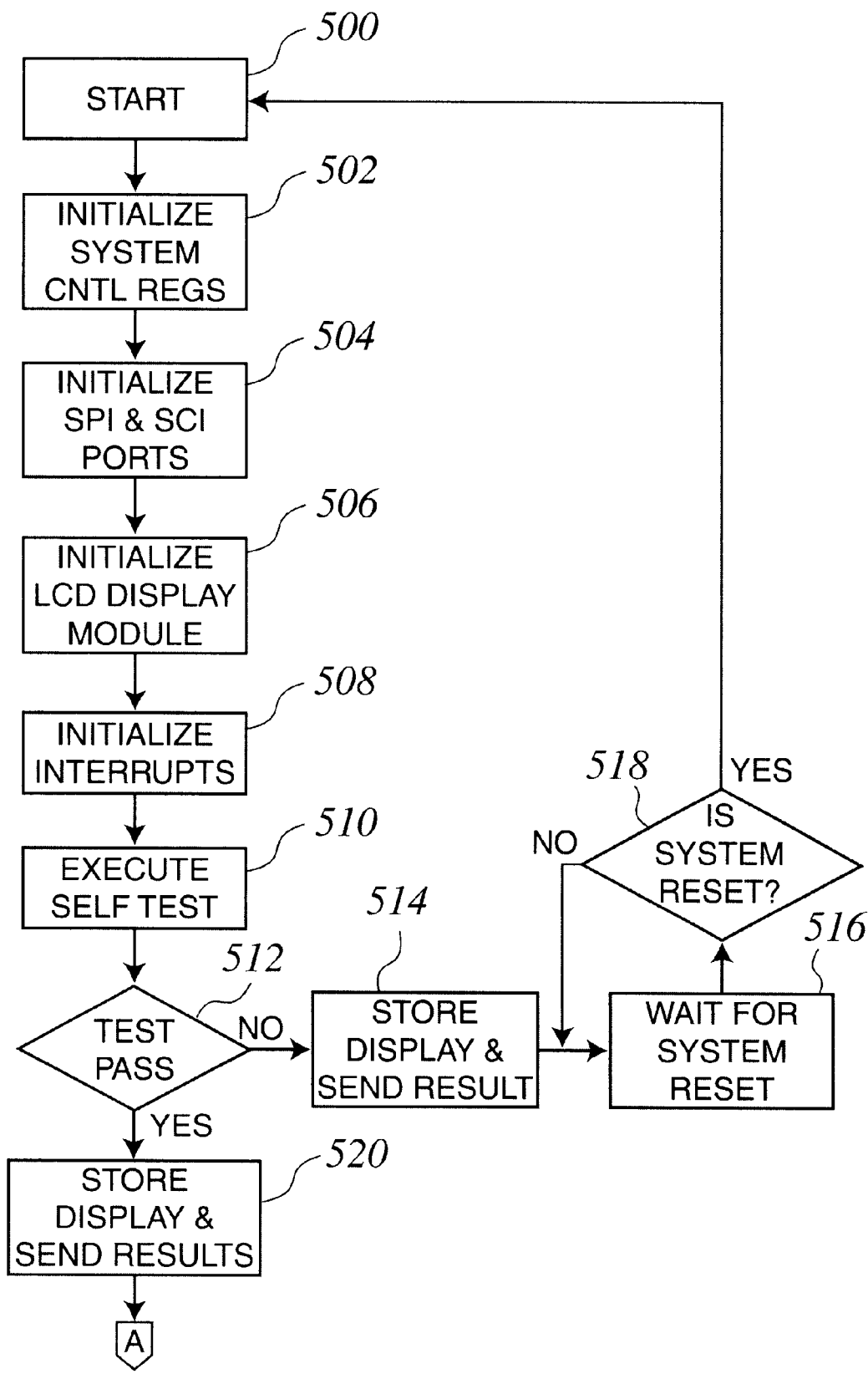
Figure 14B:
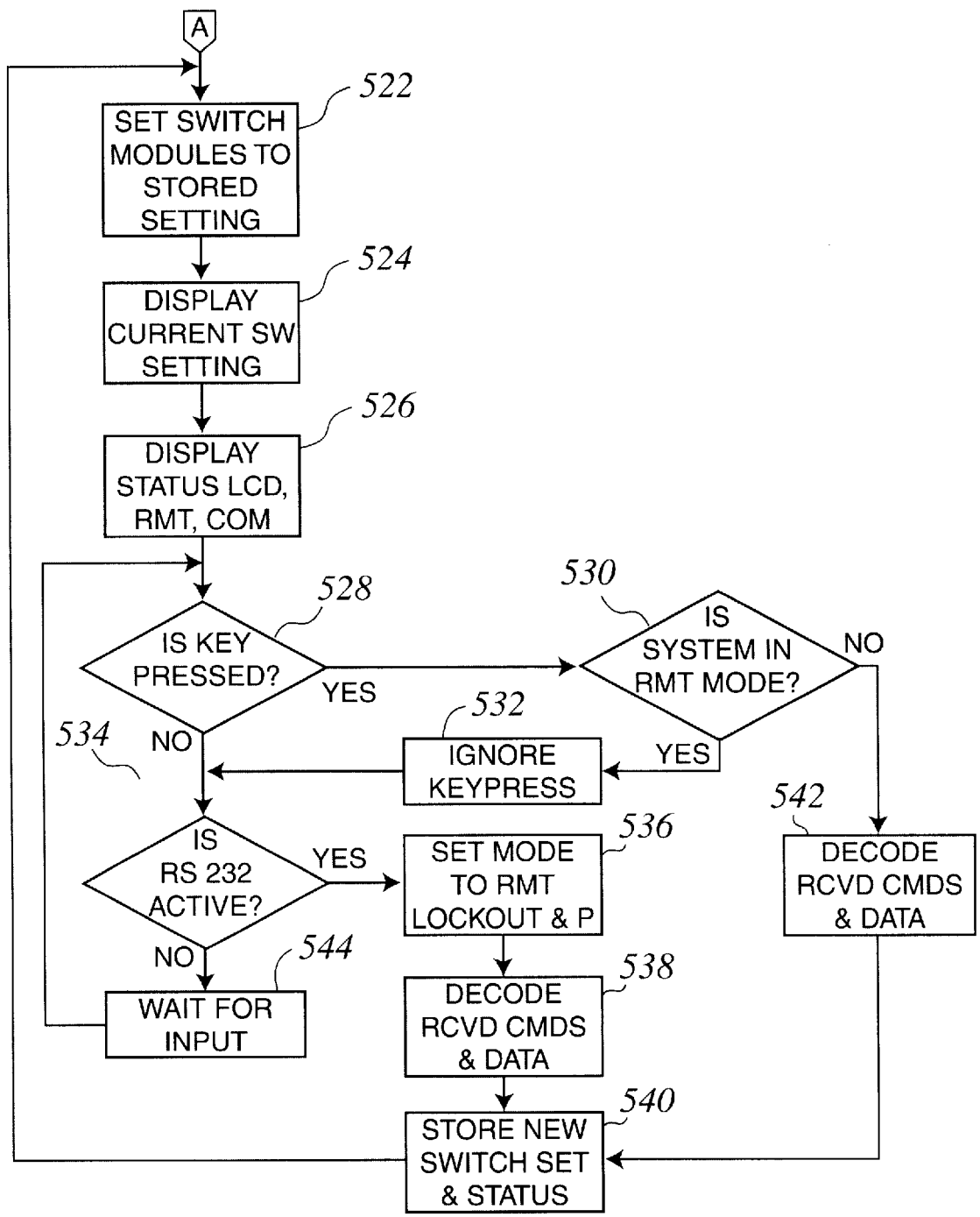

As shown in FIG. 14, the main program controlling the bridge 100 is described. The program is started 500, initializes 502 the system control registers and initializes 504 the SPI port 144 and SCI port 137. The system then initializes the LCD display module and Interrupts at 506 and 508, respectively. A self-test is then executed 510. The system then queries 512 as to whether the test was passed. In the event the self-test failed, the routine stores, displays and sends the result at 514, waits for the system to be reset at 516 and 518, and branches back to start 500.

In the event the test was passed at 512, the results are stored, displayed and sent at 520. The switch modules 116 (FIG. 3) are set 522 to the stored settings and displayed 524. The status of various components may be displayed at 526. The system then may query 528 whether a key is pressed. If yes, the system may query 530 whether the bridge 100 (FIG. 7) is in remote mode. If yes (it is in remote mode) the routine ignores 532 the key press and continues at 534. In the event the query 528 is negative, the routine also continues at 534 to query as to whether the RS232 port is active. If query 534 is positive, the mode is set 536 to remote, to decode 538 received commands and data, and stores 540 any new switch settings and status parameters. In the event the query 530 was negative (i.e., the system is not in remote mode, the routing decodes 542 the key commands and data input at keypad 406 (FIGS. 6 and 16), and continues at step 540. Once step 540 is executed, the routine branches back to step 522. In the event the response to query 534 is negative, the routine waits 544 for input and branches back to step 528.

Turning now to FIGS. 15–17, in a variation of the present invention, the synchro/resolver bridge 100 is incorporated into an automatic synchro/resolver test station 104. As shown, the test station 104 includes a unitary test frame 146 (FIGS. 15–16) which serves to house the bridge 100, a digital analyzing voltmeter (DAV) 148 such as a North Atlantic Model 2250 device, a power supply 150 such as an ELGAR series 9012A and a data acquisition/switch unit 152 such as an HP model 34970A. Computer 102, including a user interface such as a monitor 154, printer 156 (FIG. 17) and a user input device such as a keyboard 158, are coupled to the bridge 100 by the serial port 138 and to the voltmeter 148, power source 150, and data acquisition switch 152 by an IEEE 488 bus (not shown). The computer 102 includes memory storage media (not shown) having computer readable program code embodied therein for automatically operating the individual components of test station 104 according to predetermined test parameters shown in the flowcharts of FIGS. 19–24, as will be discussed in greater detail hereinbelow. As shown, these flowcharts implement conventional test procedures known to those skilled in the art, such as set forth in United States Defense, L.P. Critical Item Development Specification 19200-12976069 for the position sensor subsystem of the Bradley M2A3/M3A3 Fighting Vehicle System, which is fully incorporated herein by reference. The test station 104 thus may test discrete angle accuracy, phase shift, input impedances, transformation ratio, primary current and primary power. Test results along with product part number, part name and revisions may be recorded and printed for the user. The test station 104 is fully programmable using well-known, conventional programming techniques and/or programming languages. New products may be added by entering data into a program file that is saved to disk memory for future use. The equipment includes various displays, such as shown in FIG. 16 to enable use in local (stand-alone) modes and/or automated modes controlled by the computer 102. The test station 104 provides test throughput that may be 10 times or greater than that of prior art manually operated analog bridges, with relatively less chance for operator error. Moreover, conventional actuators or servo devices (not shown) may be coupled to the test station 104 to effect movement of the synchro/resolver 112 under test to further automate the testing process.

Figure 19:
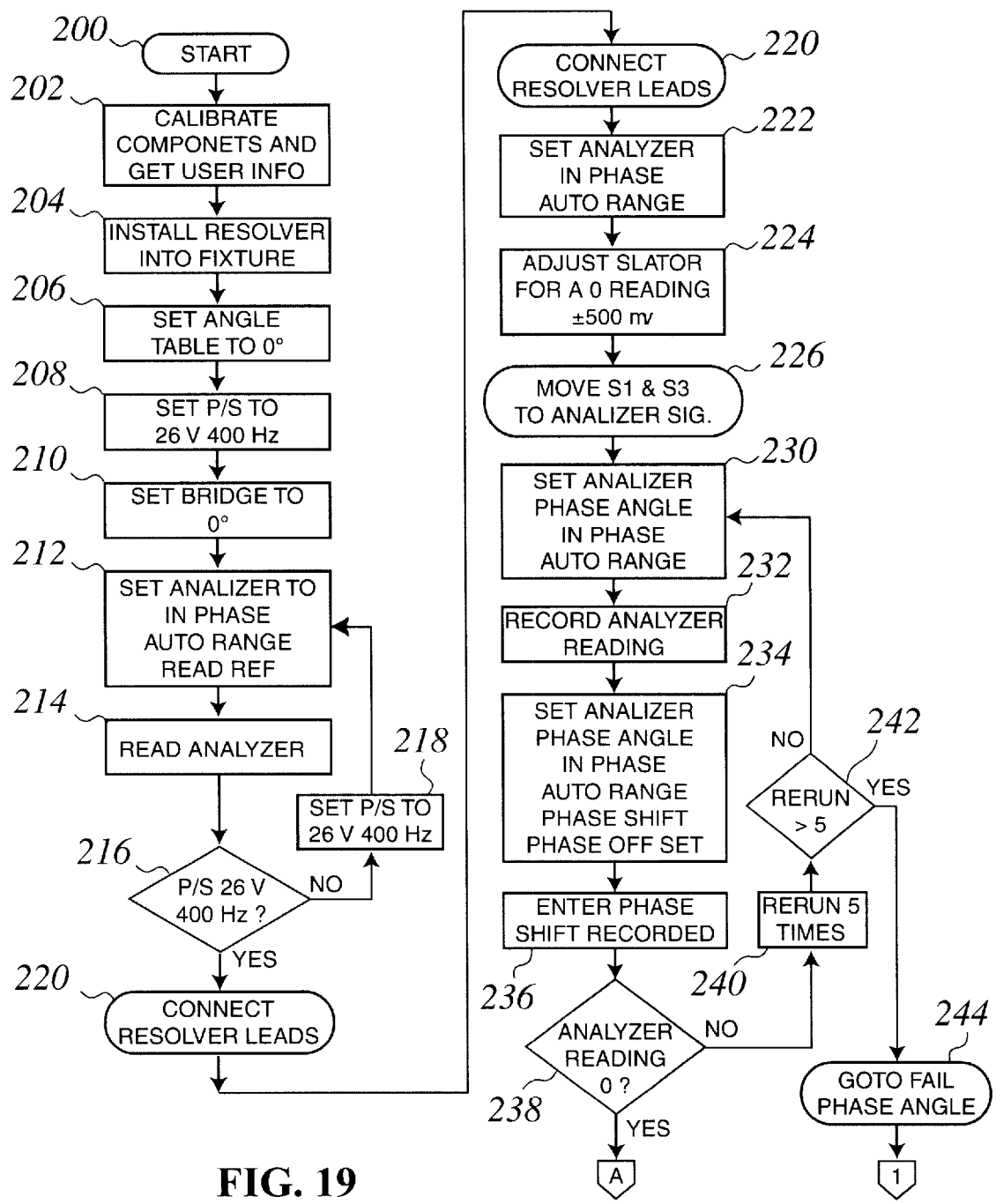
FIGS. 19–22 are flowcharts of test procedures executed by the automatic resolver test station of the present invention, utilized to generate a portion of the test results of FIG. 18.

Turning to 19–21, various testing procedures implementable by the present invention will be described in greater detail. As shown in FIG. 19, once the testing routine is initiated 200, the routine calibrates 202 the components of the system 104 and requests information from the user regarding the identification of the item under test. The user is then prompted 204 to install a Resolver into the test fixture. The system (or the user) sets 206 the test stand to the zero degree position and sets 208 the Power Source 150 (FIG. 17) to 26 volts at 400 Hz. The Bridge 100 (FIG. 17) is set 210 to zero degrees. The DAV 148 (FIG. 17) is then set 212 to "In Phase, Auto Range, Read Reference Signal." The DAV is then read 214 to determine 216 whether the reference signal generated by the DAV is 26 volts at 400 Hz. If a different voltage was read, the Power Source 150 (FIG. 17) is reset 218 and the routine is branched back to 212. Alternatively, in the event the desired reference voltage is read, the routine instructs the user to connect 220 the Resolver leads.

Figure 27:
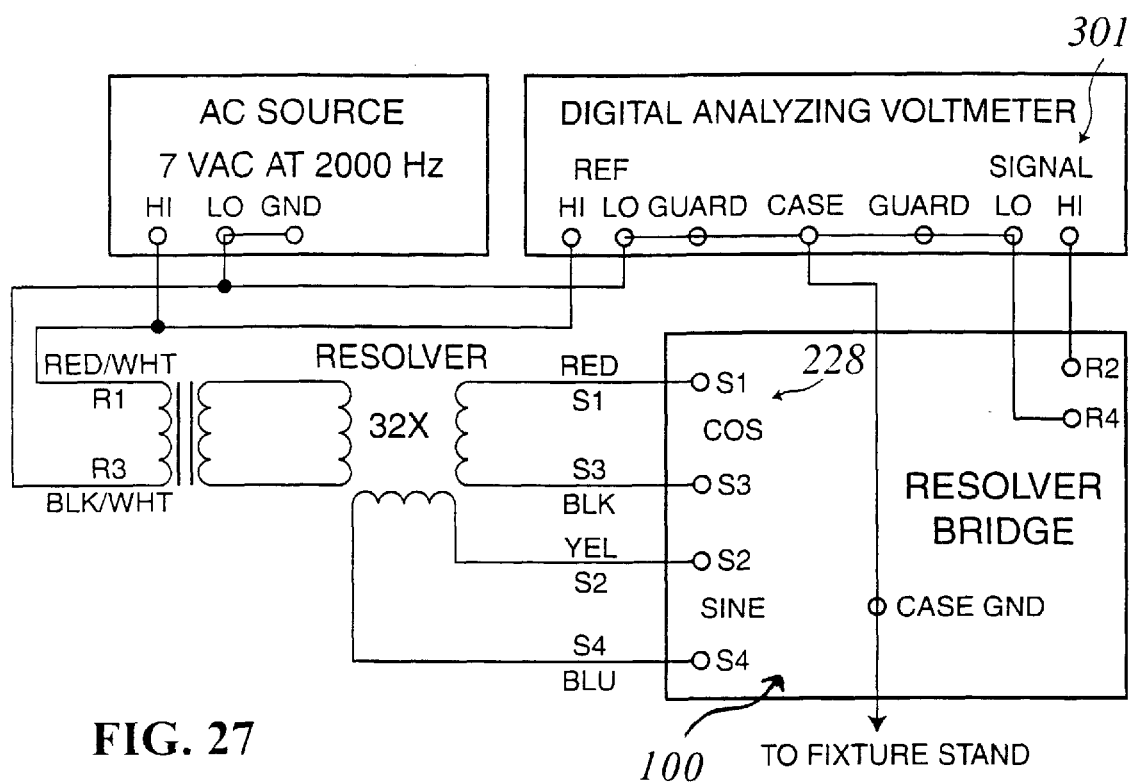

The Analyzer 148 (FIG. 17) is then set 222 to "In Phase, Auto Range" and the system then either automatically adjusts, or instructs the user to adjust, 224 the stator (i.e., the shaft of the Resolver 100) for a zero (0) reading (+/−500 μv) on the DAV 148 (FIG. 17). The S1 and S3 ports (i.e., terminations) of a first coil of the Resolver are connected 226 either automatically or by the user, to the signal terminals 228 of the bridge 100 (FIG. 16), such as shown in FIG. 27. The DAV is then set 230 to "Phase Angle; In Phase; Auto Range" and the DAV reading is recorded 232. The DAV is then set 234 to "Phase Angle; In Phase; Auto Range; Phase Shift; Phase Offset" and the Phase Shift reading is recorded 236. The DAV reading recorded at 236 is analyzed at 238 to determine whether the value is zero. If the value is not zero, the routine branches to step 230 to be retested up to five times (at 240). In the event the Resolver fails after five attempts, the routine branches 242 to indicate failure 244 of the Phase Angle test. In the event step 238 determines that the reading is equal to zero, the routine continues at 246 (FIG. 20).

Figure 20:
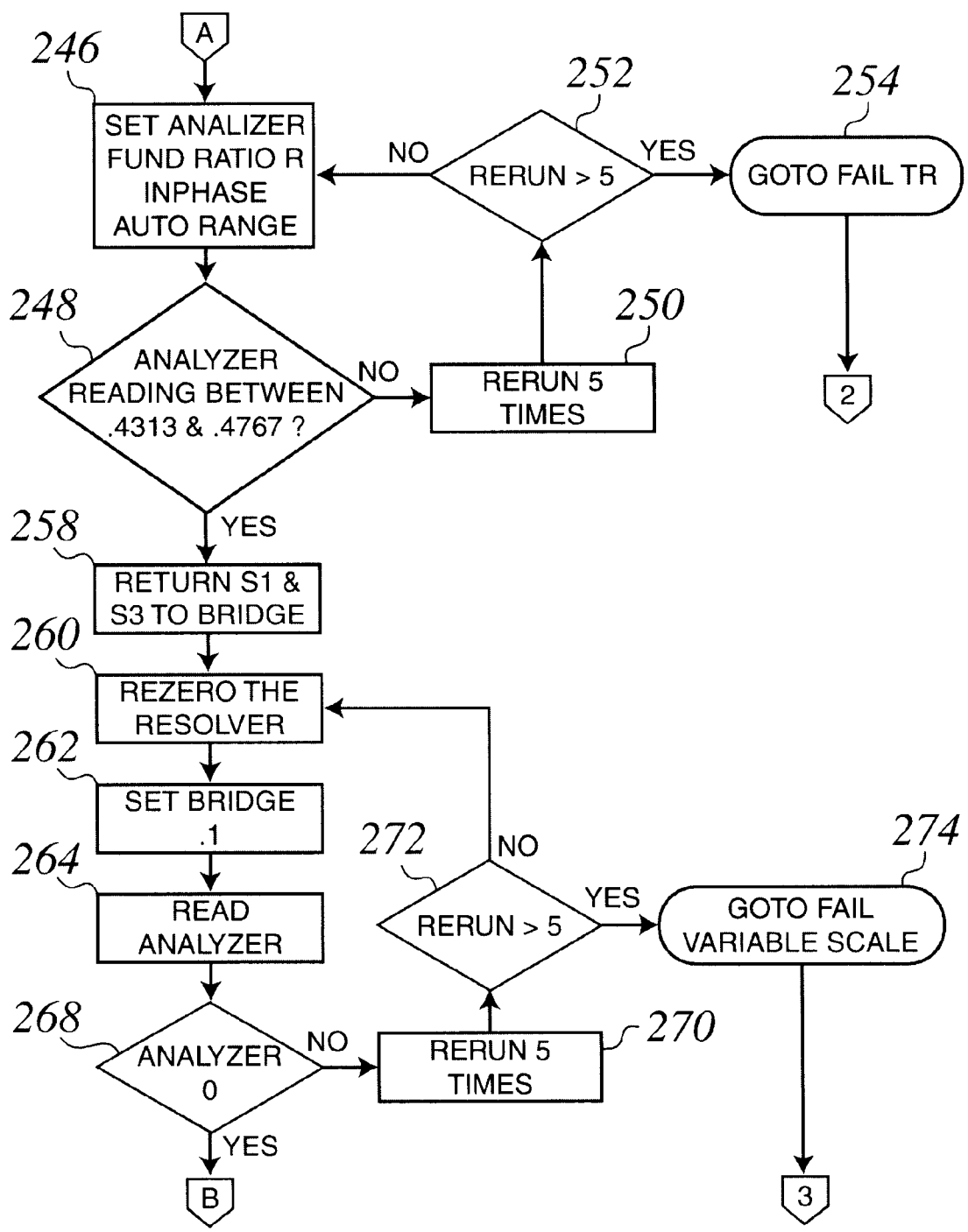

Continuing at FIG. 20, the routine sets 246 the DAV to "Find Ratio R; In Phase; Auto Range" and determines 248 whether; the DAV reads between 0.4313 and 0.4767. In the event the reading is outside this range, the routine branches back to step 246 up to five times at 250 and 252, before generating a fail signal at 254.

In the event the reading at 248 is within range, ports S1 and S3 of the first resolver coil are coupled 258 either by the user, or automatically coupled, to the S1/S3 terminals 228 of the Bridge 100 (FIG. 16). This wiring is shown schematically in FIG. 27. The resolver under test is re-zeroed 260, the Bridge 100 is set 262 to 0.1, and the DAV 148 is read at 264 and queried as to whether the reading is zero at 268. In the event the reading is not zero, the routine branches back to step 260 up to five times at 270 and 272 in similar manner to that discussed hereinabove, before generating a "Fail Variable Scale" signal 274. In the event step 268 yields an affirmative response, the routine continues at step 276 of FIG. 21.

Figure 21:
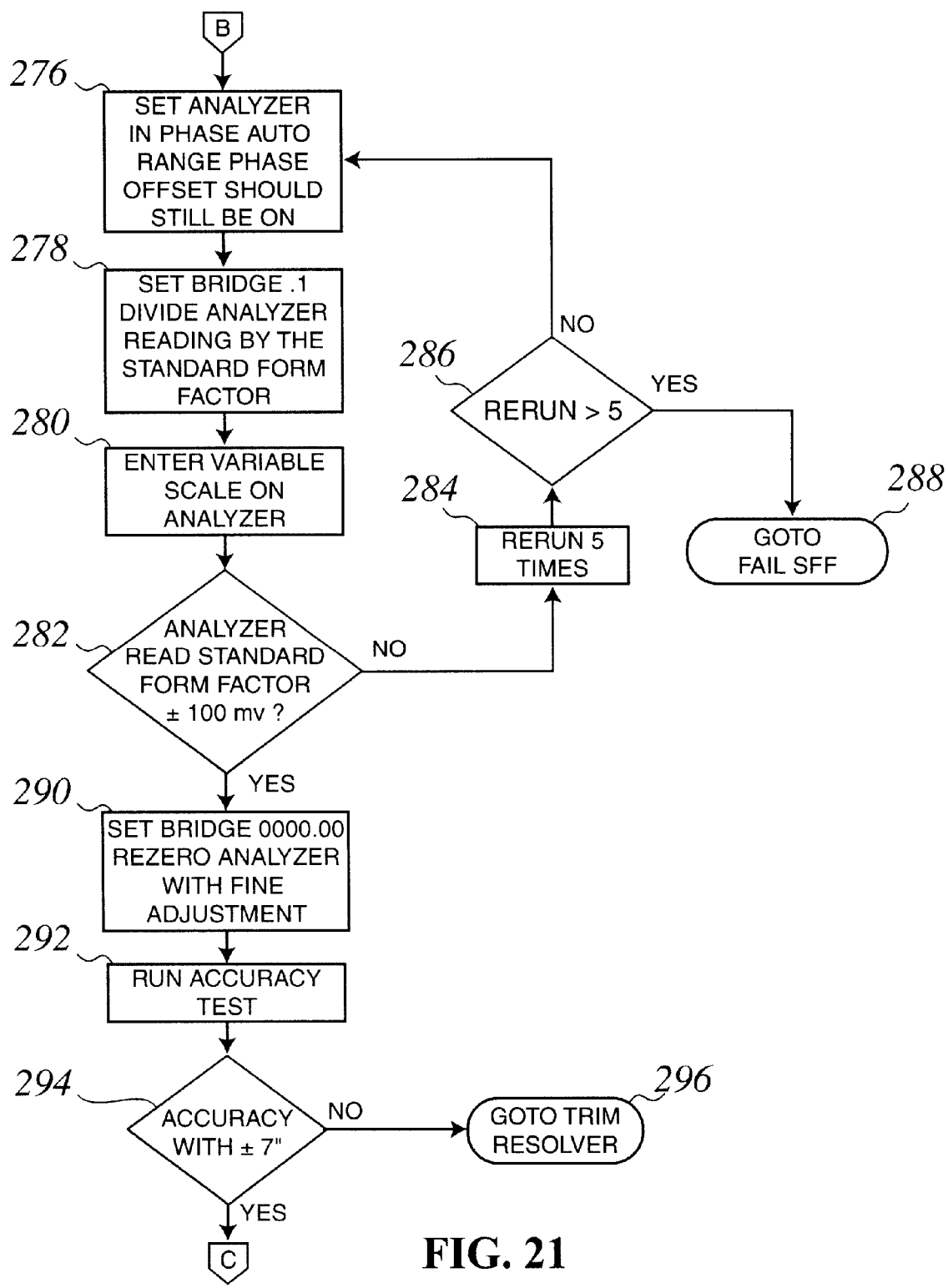

Turning now to FIG. 21, The DAV is set 276 to "In Phase"; and "Auto Range"; (Phase Offset should still be in the "On" position. The bridge 100 is set (at step 278) to 0.1 and the reading divided by a predetermined industry standard form factor. The "Variable Scale" is entered 280 on the DAV. The DAV is then queried 282 to determine whether, the predetermined form factor, +/−100 mv, was read. In the event this value was not read, the routine branches to step 276, up to five times, i.e. at 284 and 286, before generating a "Fail SFF" message at 288.

In the event the query at step 282 was affirmative, the bridge 100 is set to 0000.00 at 290, and the DAV re-zeroed and set to "fine" adjustment. A conventional accuracy test is run at 292, and the system queried at 294 to determine whether the accuracy is within a desired tolerance i.e., within +/−7"). If the resolver under test is not within tolerance, the routine branches 296 to a sub-routine to trim the resolver. The preparation of such a trimming sub-routine is well within the skill of one skilled in the art. In the event the resolver under test is within the desired tolerance, the routine branches to step 298 of FIG. 22.

Figure 22:
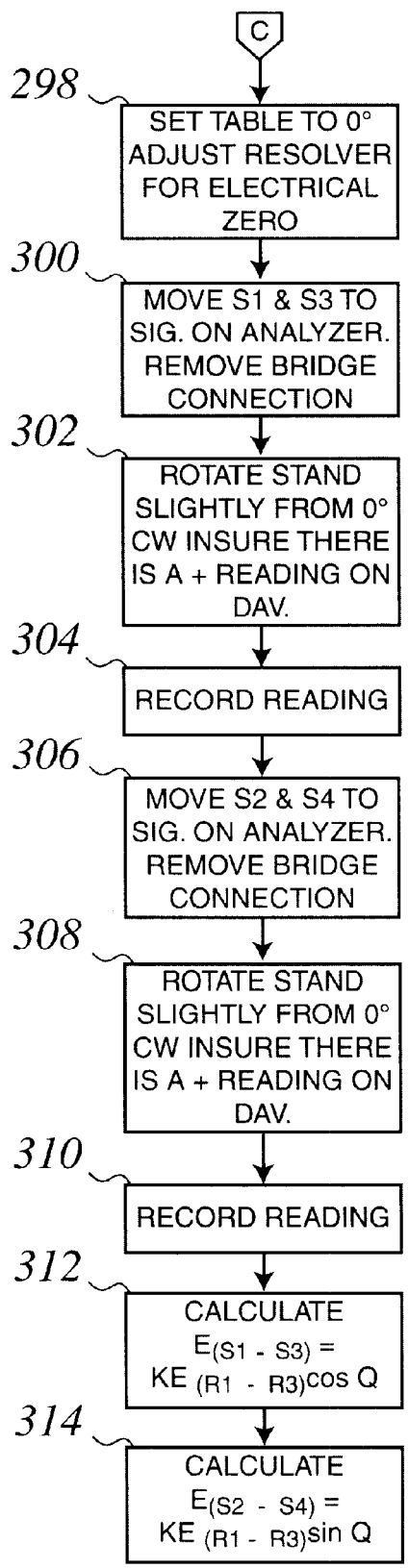
Figure 25:
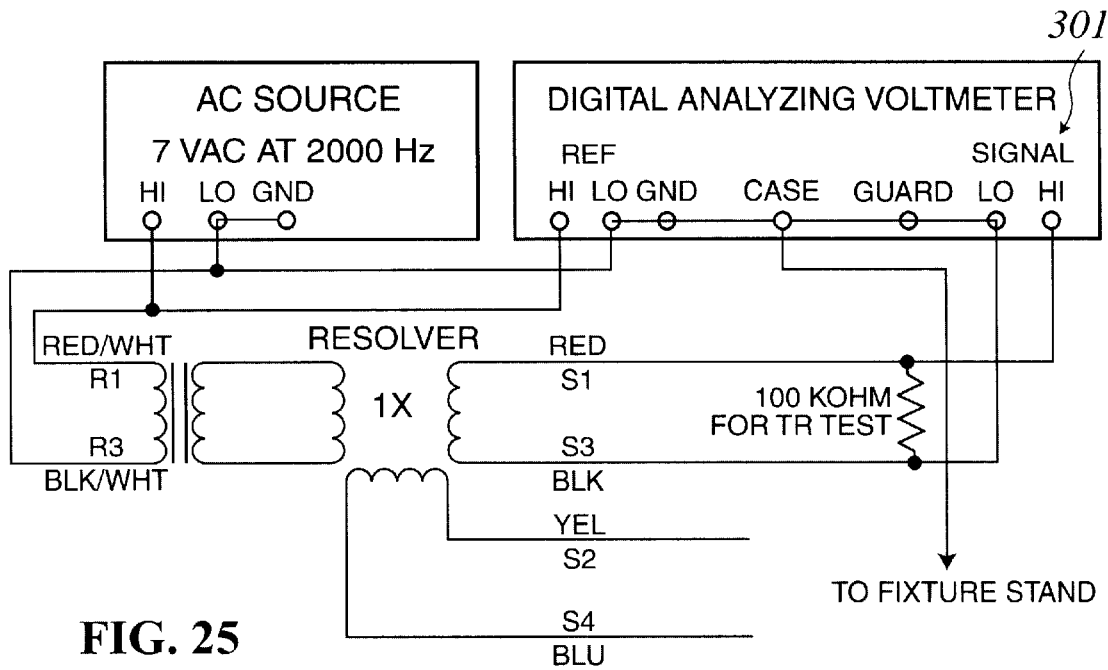
FIGS. 25–27 are schematic representations of exemplary interconnections between various componentry of the present invention and items under test, during operation of the present invention.
Figure 26:
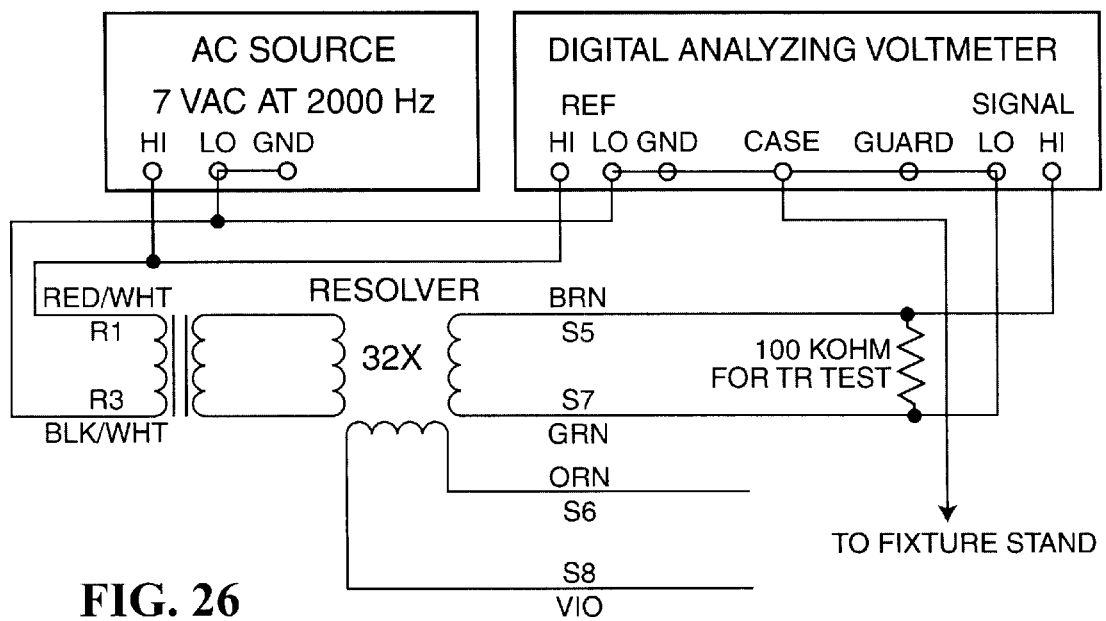

Turning now to FIG. 22, at 298, the system either automatically sets the test table to zero and adjusts the resolver under test for electrical zero, or prompts the user to do so. The user is then prompted to move 300 (or the system automatically moves) leads from the S1 and S3 resolver ports to the signal terminals 301 of the DAV (i.e., as shown in FIG. 25). The test stand is then rotated counterclockwise 302 from zero degrees to ensure a positive reading is generated by the DAV. This reading is recorded 304. Leads are then respectively connected 306, either automatically or by the user, between the S2 and S4 terminals of a second resolver coil (FIG. 25) and the signal terminals 301 of the DAV. The test stand is then rotated clockwise 308 from zero degrees to ensure a positive reading is generated by the DAV. This reading is recorded at 310. $E_{(S1-S3)}$ and $E_{(S2-S4)}$ are then calculated at 312 and 314 using equations 1. and 2. in Appendix B hereof.

Figure 23:
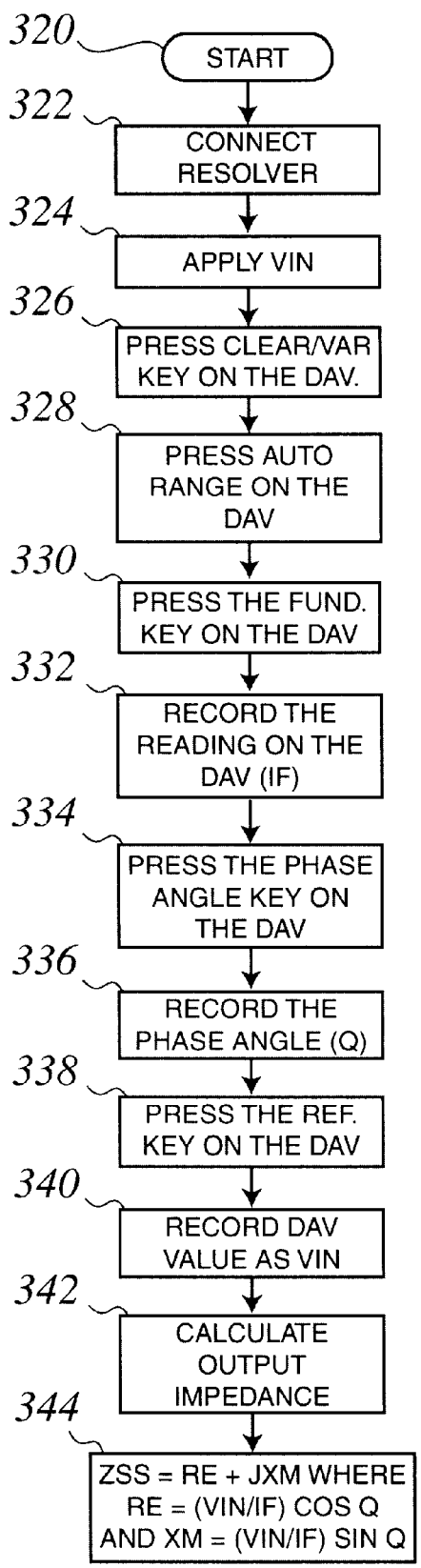
FIGS. 23 and 24 are flow charts of steps performed by the automatic resolver test station of the present invention utilized to generate an other portion of the test results of FIG. 18.

The ZSS Output Impedance (Output Impedance with input Shorted) is calculated as shown in FIG. 23. Once the routine (i.e., software module) is started at 320, the resolver is connected to the system at 322. Vin is applied at 324 and the "Clear/Var" key on the DAV is automatically or manually actuated at 326. The DAV is then set 328 to "Auto Range" and the "Fund." key is actuated at 330. The reading output by the DAV is recorded at 332. The "Phase Angle" key of the DAV is actuated at 334 the Phase Angle (Q) recorded at 336. The "Ref." key on the DAV is actuated at 338 and the value returned is recorded as Vin at 340. The Output Impedance is then calculated at 342 using equation 3 of Appendix B shown at step 344.

Figure 24:
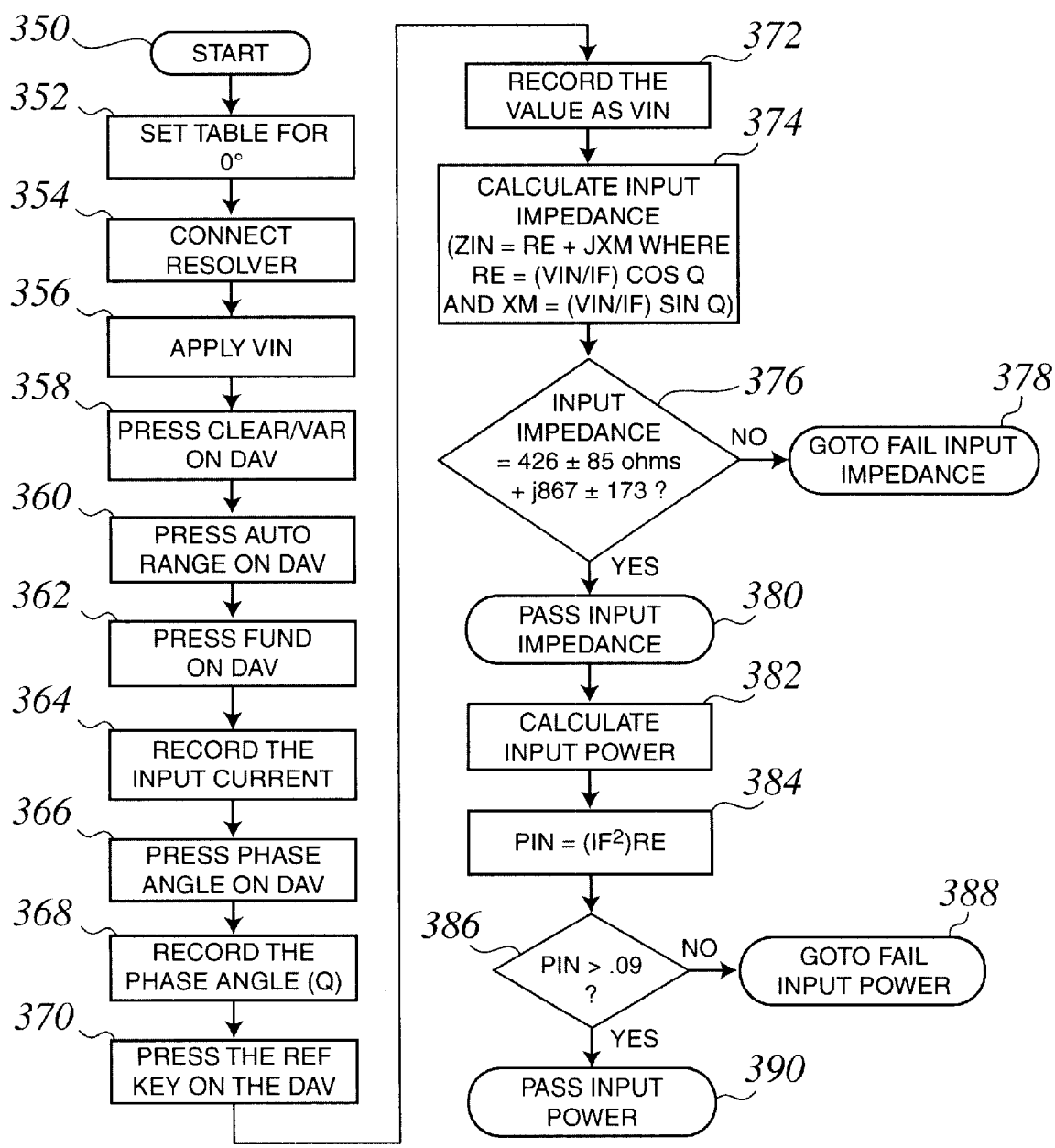

Input Impedance (Current and Power) is tested as shown in FIG. 24. Once initiated at 350, the test table is set for zero degrees at 352 and the Resolver under test is connected in a conventional manner at 354. Vin is applied at 356 and the "Clear/Var", "Auto Range" and "Fund" switches of the DAV are actuated at 358, 360 and 362, respectively. The Input Current returned by the DAV is recorded at 364. The "Phase Angle" setting of the DAV is actuated at 366 and the Phase Angle (Q) returned by the DAV is recorded at 368. The "Ref" key of the DAV is set at 370 and the Value returned is recorded at 372. The Input Impedance Zin is calculated at 374 using equation 4 of Appendix B.

The routine determines 376 whether the calculated Input Impedance is equal to 426+/−85 ohms+j867+/−173. If the Input Impedance is not equal to this value, then the system indicates a failure of the input impedance test at 378. Otherwise, the system indicates the test was passed at 380, followed by calculation of Input Power at 382, using the formula $Pin=(if^2)Re$ as shown at 384. The system then determines whether the calculated Pin is greater than 0.09 at step 386. If No, then a failure is indicated at 388. Otherwise, the test is passed as indicated at 390.

Turning now to FIG. 18, block 154 includes exemplary data generated by the test station 104 as a result of running the test processes shown in FIGS. 19–22. Test result block 156 includes test data generated by system 104 upon executing the test routines disclosed in FIGS. 23 and 24. This test result block 156 exhibits improved accuracy relative to prior art manual testing since system 104 performs this testing prior to testing each individual synchro/resolver 112. Prior art manual testing approaches generally do not complete these test routines prior to testing each individual resolver 112 due to the laborious nature of doing so. Rather, such testing is generally conducted only once per batch of resolvers 112. Thus, prior art techniques relatively frequently require retesting of an entire batch of synchro/resolvers in the event the test results shown in block 156 indicate a failure.

The routines of FIGS. 19–24 may be programmed into computer 102 using any convenient programming means known to those skilled in the art, such as the LabView 3.0 or LabWindows icon-based programming language available from National Instruments Corporation, Visual Basic, and the C or C++ programming language, etc. The computer 102 may be a conventional personal computer (PC), running in a Windows environment, a workstation running in a Windows or Unix environment or may be an embedded processor. The foregoing description is intended primarily for purposes of illustration. Although the invention has been shown and described with respect to an exemplary embodiment thereof, it should be understood by those skilled in the art that the foregoing and various other changes, omissions, and additions in the form and detail thereof may be made therein without departing from the spirit and scope of the invention.

APPENDIX B (eq. 1)  $E_{(S1-S3)} = KE_{(R1-R3)} \cos \theta$
(eq. 2)  $E_{(S2-S4)} = KE_{(R1-R3)} \sin \theta$ These equations 1. and 2. are derived from the equations:

$E_{(S1-S3)} = NE_{(R1-R3)} \cos \theta - NE_{(R2-R4)} \sin \theta$
and
$E_{(S2-S4)} = NE_{(R2-R4)} \cos \theta + NE_{(R1-R3)} \sin \theta$
where:
  $E_{(S1-S3)}$ = Voltage between stator leads S1 and S3;
  $E_{(S2-S4)}$ = Voltage between stator leads S2 and S4;
  $E_{(R1-R3)}$ = Voltage between rotor leads R1 and R3;
  $E_{(R2-R4)}$ = Voltage between rotor leads R2 and R4;
  N = K = Ratio of maximum RMS voltage between the Secondary (Stator) terminals and the Primary (Rotor) terminals; and
  $\theta$ = the angle between the Rotor and Stator windings.

In the event the resolver under test does not have a second (R2–R4) rotor coil, the $NE_{R2-R4}$ term drops out and the equations become:
$E_{(S1-S3)} = NE_{(R1-R3)} \cos \theta$
and
$E_{(S2-S4)} = NE_{(R1-R3)} \sin \theta$
Since the R1–R3 winding is in phase ($\theta = 0$) with the S1–S3 winding and 90 degrees out of phase ($\theta = 90°$) with the S2–S4 winding, then at electrical zero the equations become:
$E_{(S1-S3)} = NE_{(R1-R3)} \cos 0 = NE_{(R1-R3)}$
and
$E_{(S2-S4)} = NE_{(R1-R3)} \sin 90 = NE_{(R1-R3)}$ (eq. 3)  ZSS = Re + Jxm Where Re = (Vin/IF)Cos Q and Xm = Vin/IF) Sin Q
(eq. 4)  Zin = Re + JXm where Re = (Vin/if)cosQ and Xm = (Vin/if)sin Q).

Having thus described the invention, what is claimed is:

1. A digital synchro/resolver bridge for use in testing electrically operated synchros or resolvers of the type adapted to generate electrical signals of varying voltage, current, or phase in response to rotational movement of a first member relative to a second member, said digital bridge comprising:

first and second transformer coil assemblies being sized, shaped and oriented to generate electrical signals at terminals thereof, said electrical signals having predetermined voltage, current, impedance, or phase characteristics to simulate the output of the synchro or resolver at predetermined rotational positions of the first member relative to the second member;

a microprocessor;

a plurality of relays electrically coupled to said microprocessor;

said plurality of relays being coupled to discrete positions spaced along the windings of said transformer coil assemblies;

each of said plurality of relays being coupled to one of said terminals;

each of said plurality of relays being selectively actuatable by said microprocessor to alternately couple and de-couple said terminals to said discrete positions along the windings;

a memory storage device electrically coupled to said microprocessor and being capable of accepting computer readable program code therein to control the operation of said microprocessor; and said memory storage device being capable of accepting computer readable data therein to match individual ones of said plurality of relays to each of said predetermined angular positions ranging from 0 to 360 degrees.

2. The digital bridge of claim 1, wherein said memory storage device further comprises computer readable program code embodied therein to control the operation of said microprocessor.

3. The digital bridge of claim 1, wherein said memory storage device further comprises computer readable data embodied therein to match individual ones of said plurality of relays to each of said predetermined angular positions ranging from 0 to 360 degrees.

4. The digital bridge of claim 1, wherein said relays comprise electrical/electromechanical relays.

5. The digital bridge of claim 3, wherein said computer readable data is disposed within a look-up table.

6. The digital bridge of claim 1, wherein said memory storage device further comprises computer readable program code to generate a power on self-test of said digital bridge.

7. The digital bridge of claim 1, wherein said memory storage device comprises an Erasable Programmable Read-Only Memory (EPROM) device.

8. The digital bridge of claim 7, wherein said EPROM device has said computer readable program code embodied therein to control the operation of said relays.

9. The digital bridge of claim 7, wherein said memory storage device further comprises an Electrically Erasable Programmable Read-Only Memory (EEPROM).

10. The digital bridge of claim 7, wherein said EPROM has said computer readable data embodied therein to match individual ones of said plurality of relays to each of said predetermined angular positions.

11. The digital bridge of claim 1, further comprising an array of relay switch modules coupled to said transformer coil assemblies and to said microprocessor;

each of said relay switch modules having a multiplexer disposed therein, said multiplexer being coupled to various ones of said plurality, of electromechanical relays.

12. The digital bridge of claim 11, wherein said relay switch modules are coupled to said microprocessor with a relay switch module port.

13. The digital bridge of claim 1, further comprising a user interface.

14. The digital bridge of claim 13, wherein said user interface comprises a liquid crystal display (LCD).

15. The digital bridge of claim 14, further comprising:
   a LCD port coupled to said microprocessor;
   a LCD display control circuit coupled to said LCD port said LCD port being coupled to said microprocessor by a data bus and a control bus;
   a LCD backlight port coupled to said LCD;
   a LCD backlight power supply and power supply circuit coupled to said LCD; and
   a serial port controller coupled to a serial port and to said microprocessor.

16. The digital bridge of claim 14, wherein said user interface further comprises a user input device coupled to said microprocessor.

17. The digital bridge of claim 16, wherein said user input device comprises a keypad.

18. The digital bridge of claim 1, further comprising a debug port coupled to said microprocessor, said debug port adapted for being coupled to a system emulator or debugger for debugging or reconfiguring said computer readable program code and said computer readable data disposed in said memory device.

19. The digital bridge of claim 1, further comprising a communications port coupled thereto, wherein said digital bridge is adapted for operation within a integrated test system.

20. The digital bridge of claim 1, further comprising computer readable program code embodied within said memory device for implementing a self-test to effect calibration of said digital bridge.

21. An automatic synchro/resolver test station for testing synchros or resolvers of the type adapted to generate electrical signals of varying voltage, current impedance or phase characteristics in response to rotational movement of a first member relative to a second member, said test station comprising:
   the digital synchro/resolver bridge of claim 1;
   a digital analyzing voltmeter;
   a data acquisition/switch unit;
   a computer communicably coupled to said digital synchro/resolver, said digital analyzing voltmeter and said data acquisition/switch unit;
   memory storage media communicably coupled to said computer, said memory storage media being capable of receiving computer readable program code therein for automatically interacting with said synchro/resolver bridge, said digital analyzing voltmeter, and said data acquisition/switch unit according to predetermined test parameters and to acquire and record data generated thereby.

22. The synchro/resolver test station of claim 21, wherein said memory storage media further comprises computer readable program code embodied therein for automatically interacting with said synchro/resolver bridge, said digital analyzing voltmeter, and said data acquisition/switch unit according to predetermined test parameters and to acquire and record data generated thereby.

23. The synchro/resolver test station of claim 21, further comprising a user interface including a user input device and an output device.

24. The synchro/resolver test station of claim 23, wherein said user interface comprises a keyboard and display.

25. The synchro/resolver test station of claim 24, wherein said user interface said user interface further comprises a printer.

26. The synchro/resolver test station of claim 21, further comprising a power supply.

27. The synchro/resolver test station of claim 21, wherein said digital synchro/resolver bridge, said digital analyzing voltmeter, said data acquisition/switch unit, said computer and said memory storage media are disposed on a unitary test frame.

28. The synchro/resolver test station of claim 21, further comprising a RS232 serial port coupling said digital synchro/resolver bridge to said computer.

29. The synchro/resolver test station of claim 21, wherein said digital analyzing voltmeter, said power supply and said data acquisition/switch unit are all coupled to said computer by an IEEE 488 bus.

30. An automatic synchro/resolver test station for testing synchros or resolvers of the type adapted to generate electrical signals of varying voltage, current impedance, or phase characteristics in response to rotational movement of a first member relative to a second member, said test station comprising:
   a unitary test frame;
   a digital synchro/resolver bridge disposed within said test frame; said digital bridge including:
      first and second transformer coil assemblies being sized, shaped and oriented to generate electrical signals at terminals thereof, said electrical signals having predetermined voltage, current, impedance, or phase characteristics to simulate the output of the synchro or resolver at predetermined rotational positions of the first member relative to the second member;
   a microprocessor;
   a plurality of relays electrically coupled to said microprocessor;
   said plurality of relays being coupled to discrete positions spaced along the windings of said transformer coil assemblies;
   each of said plurality of relays being coupled to one of said terminals;
   each of said plurality of relays being selectively actuatable by said microprocessor to alternately couple and de-couple said terminals to said discrete positions along the windings;
   a memory storage device electrically coupled to said microprocessor and having computer readable program code embodied therein to control the operation of said microprocessor; and
   said memory storage device having computer readable data embodied therein to match individual ones of said plurality of relays to each of said predetermined angular positions;
   a digital analyzing voltmeter disposed within said test frame;
   a power supply disposed within said test frame;
   a data acquisition/switch unit disposed within said test frame;
   a computer;
   a user interface;
   said digital synchro/resolver bridge being coupled by an RS232 serial port to said computer;
   said digital analyzing voltmeter, said power supply and said data acquisition/switch unit all being coupled to said computer by an IEEE 488 bus;
   memory storage media disposed in said computer, said memory storage media having computer readable program code embodied therein for automatically interacting with said synchro/resolver bridge, said digital analyzing voltmeter, said power supply and said data acquisition/switch unit according to predetermined test parameters and to acquire and record data generated thereby.

31. A digital synchro/resolver bridge for use in testing synchros or resolvers of the type adapted to generate electrical signals of varying voltage, current, or phase in response to rotational movement of a first member relative to a second member, said bridge comprising:

first and second transformer assemblies adapted to generate electrical signals of varying voltage, current, impedance, or phase characteristics to simulate the output of said synchro or resolver at predetermined rotational positions of said first member relative to said second member;

a central processing unit, (CPU);

a relay switch module port coupled to said CPU;

an array of relay switch modules coupled to said transformer assemblies and to said relay switch module port;

each of said relay switch modules having a plurality of multiplexers disposed therein, and which are coupled to a plurality of electromechanical relays;

said plurality of electric/electro mechanical relays being coupled at discrete positions along the windings of said transformer assemblies;

an Erasable Programmable Read-Only Memory (EPROM) coupled to said CPU and incorporating computer readable program code embodied therein to control the operation of said CPU and generate power-on self-tests, coupled to said CPU;

an Electrically Erasable Programmable Read-Only Memory (EEPROM) device incorporating calibration and test contants, coupled to said CPU;

a user interface including a display and input device;

a debug port adapted for being coupled to a system emulator or debugger for debugging or reconfiguring said program code disposed in said EPROM; and a communications port.

32. A method for testing electrically operated synchros or resolvers of the type adapted to generate electrical signals of varying voltage, current, or phase in response to rotational movement of a first member relative to a second member, said method comprising the steps of:

(a) providing a digital synchro/resolver bridge including:
first and second transformer coil assemblies being sized, shaped and oriented to generate electrical signals at terminals thereof, said electrical signals having predetermined voltage, current, impedance, or phase characteristics to simulate the output of the synchro or resolver at predetermined rotational positions of the first member relative to the second member;

a microprocessor;

a plurality of relays electrically coupled to said microprocessor;

said plurality of relays being coupled to discrete positions spaced along the windings of said transformer coil assemblies;

each of said plurality of relays being coupled to one of said terminals;

each of said plurality of relays being selectively actuatable by said microprocessor to alternately couple and de-couple said terminals to said discrete positions along the windings;

a memory storage device electrically coupled to said microprocessor and having computer readable program code embodied therein to control the operation of said microprocessor; and said memory storage device having computer readable data embodied therein to match individual ones of said plurality of relays to each of said predetermined angular positions;

(b) electrically coupling the output of the synchro/resolver to the input of said digital bridge;

(c) using said microprocessor to selectively actuate discrete ones of said relays to couple said terminals to discrete positions along the windings corresponding to one of said predetermined angular positions;

(d) rotating the resolver/bridge to said one of said predetermined angular positions;

(e) comparing the signals emerging from the digital bridge to one another; and (f) completing a power-on test of said digital bridge for each synchro/resolver under test.

* * * * *